United States Patent
Sinha et al.

(10) Patent No.: US 12,339,908 B2
(45) Date of Patent: Jun. 24, 2025

(54) SYSTEMS AND METHODS FOR MACHINE LEARNING-BASED DATA EXTRACTION

(71) Applicant: Nationstar Mortgage LLC, Coppell, TX (US)

(72) Inventors: Ankit Kumar Sinha, Dallas, TX (US); Hasan Kohadawala, Chennai (IN); Bhargava Reddy Karumuri, Dallas, TX (US); Saravanan Annamalai, Chennai (IN); Kishorekumar Torangallu, Dallas, TX (US); SaiNikitha Cheruku, Begaluru (IN)

(73) Assignee: Nationstar Mortgage LLC, Coppell, TX (US)

( * ) Notice: Subject to any disclaimer, the term of this patent is extended or adjusted under 35 U.S.C. 154(b) by 0 days.

(21) Appl. No.: 17/488,108

(22) Filed: Sep. 28, 2021

(65) Prior Publication Data

US 2023/0101817 A1    Mar. 30, 2023

(51) Int. Cl.
 *G06F 16/90* (2019.01)
 *G06F 16/903* (2019.01)
 *G06F 16/93* (2019.01)

(52) U.S. Cl.
 CPC ........ *G06F 16/90344* (2019.01); *G06F 16/93* (2019.01)

(58) Field of Classification Search
 None
 See application file for complete search history.

(56) References Cited

U.S. PATENT DOCUMENTS

| | | | |
|---|---|---|---|
| 6,738,517 B2 | 5/2004 | Loce et al. | |
| 7,117,432 B1* | 10/2006 | Shanahan | G06F 16/353 |
| | | | 715/236 |
| 8,996,350 B1 | 3/2015 | Dub et al. | |
| 10,354,134 B1 | 7/2019 | Becker et al. | |
| 2009/0092320 A1 | 4/2009 | Berard et al. | |
| 2014/0072219 A1 | 3/2014 | Tian | |
| 2014/0149105 A1* | 5/2014 | Lamba | G06F 40/279 |
| | | | 704/9 |
| 2017/0024466 A1* | 1/2017 | Bordawekar | G06F 40/56 |

(Continued)

OTHER PUBLICATIONS

Eliza Grames; An automated approach to identifying search terms for systematic reviews using keyword co-occurrence networks; 2019; WileyOnlineLibrary; pp. 1645-1654.*

(Continued)

*Primary Examiner* — Ann J Lo
*Assistant Examiner* — Jermaine A Mincey
(74) *Attorney, Agent, or Firm* — Pierson Ferdinand LLP; Daniel Rose

(57) ABSTRACT

In some aspects, the disclosure is directed to methods and systems for machine learning-based data extraction using multiple string searching models. String extraction logic may differ depending on the type of document received. For documents identified to contain line item structures, broader searching models are applied to the document to account for the increased variability of data in the document inherent in data organized in line item structures. For documents identifier to contain non-line item structures, stricter searching models are applied to the document to account for predictable data in the document associated with data organized in non-line item structures.

17 Claims, 12 Drawing Sheets

(56) References Cited

U.S. PATENT DOCUMENTS

| | | | |
|---|---|---|---|
| 2019/0065576 A1* | 2/2019 | Peng | G06F 16/22 |
| 2019/0147103 A1* | 5/2019 | Bhowan | G06F 16/93 |
| | | | 707/737 |
| 2020/0074169 A1 | 3/2020 | Mukhopadhyay et al. | |
| 2020/0274990 A1 | 8/2020 | Berfanger et al. | |
| 2022/0156298 A1* | 5/2022 | Mahmoud | G06F 16/9535 |
| 2022/0179896 A1* | 6/2022 | Farrell | G06F 40/131 |

OTHER PUBLICATIONS

Non-Final Office Action for U.S. Appl. No. 16/990,900 dated Aug. 11, 2021 (13 pages).

Adnan Kiran et al: "Limitations of information extraction methods and techniques for heterogeneous unstructured big data", International Journal of Engineering, Business Management, vol. 11; http://journals.sagepub.com/doi/full-xml/10.1177/1847979019890771; Dec. 9, 2019, abstract.

Tanvir Qaisar; abstract, Retrieved from the Internet: URL:https://towardsdatascience.com/multi-page-document-classification-using-machine-learning-and-nlp-ba6151405c03, Aug. 7, 2021.

Doermann, David et al., Handbook of Document Image Processing and Recognition: excerpts; Techniques for Logical Labeling, Feb. 2, 2014, pp. 194-216, 223-225.

Liu Ying: "TableSeer: Automatic Table, Extraction, Search and Understanding", PhD Dissertation, Pennsylvania State University, https://etda.libraries.psu.edu/files/final_submissions/6921; Dec. 31, 2009.

Baviskar Dipali et al: "Efficient Automated Processing of the Unstructured Documents Using Artificial Intelligence A Systematic Literature Review and Future Directions", IEEE Access, IEEE, USA, vol. 9, Apr. 13, 2021.

* cited by examiner

SYSTEMS AND METHODS FOR MACHINE LEARNING-BASED DATA EXTRACTION

FIELD OF THE DISCLOSURE

This disclosure generally relates to systems and methods for model comparisons and data extraction. In particular, this disclosure relates to systems and methods for machine learning-based data extraction.

BACKGROUND OF THE DISCLOSURE

Classifying scanned or captured images of physical paper documents, or electronically/digitally produced third-party documents or forms may be difficult for computing systems, due to the large variation in documents, particularly very similar documents such as different pages within a multi-page document, and where metadata of the document is incomplete or absent. Previous attempts at whole document classification utilizing optical character recognition and keyword extraction or natural language processing may be slow and inefficient, requiring extensive processing and memory resources. Additionally, such systems may be inaccurate, such as where similar keywords appear in unrelated documents. For example, such systems may be unable to distinguish between a first middle page of a first multi-page document, and a second middle page of a second, similar multi-page document, and may inaccurately assign the first middle page to the second document or vice versa.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 1A:
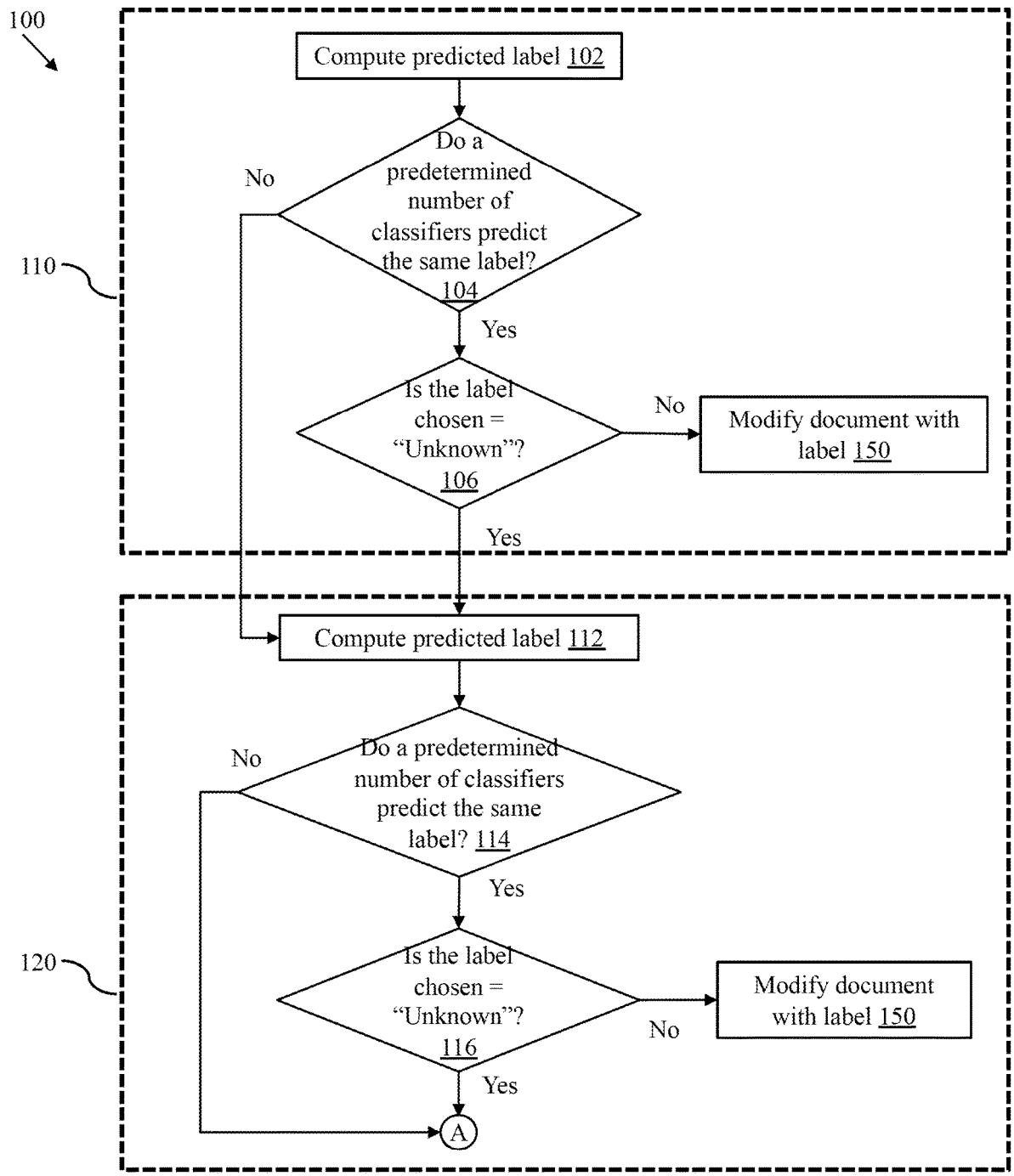
FIGS. 1A-1B are flow charts of a method for machine learning-based document classification using multiple classifiers, according to some implementations.

The details of various embodiments of the methods and systems are set forth in the accompanying drawings and the description below.

DETAILED DESCRIPTION

For purposes of reading the description of the various embodiments below, the following descriptions of the sections of the specification and their respective contents may be helpful:

Section A describes embodiments of systems and methods for machine learning-based document classification;

Section B describes embodiments of systems and methods for machine learning-based data extraction; and Section C describes a computing environment which may be useful for practicing embodiments described herein.

A. Machine Learning-Based Document Classification

Scanning documents may involve converting physical paper documents into digital image documents. A digital document may not have the same properties that paper documents have. For example, the pages in a physical document are discrete. Further, if multiple physical documents are to be read, one document may be put down, such as a textbook, and a next document may be picked up, such as the next textbook. In contrast, a scanned digital document may have continuous pages. Further, multiple documents may be scanned into one file such that there may be no clear identifier, such as the physical nature of putting one document down and picking the next one up, between one digital document from the next. Thus, the content of the scanned images may be critical in differentiating pages from another and determining when one digital document ends and the next digital document begins.

Classifying scanned or captured images of physical paper documents may be difficult for computing systems, due to the large variation in documents, particularly very similar documents such as different pages within a multi-page document, and where metadata of the document is incomplete or absent. Previous attempts at whole document classification utilizing optical character recognition and keyword extraction or natural language processing may be slow and inefficient, requiring extensive processor and memory resources. Additionally, such systems may be inaccurate, such as where similar keywords appear in unrelated documents. For example, such systems may be unable to distinguish between a first middle page of a first multi-page document, and a second middle page of a second, similar multi-page document, and may inaccurately assign the first middle page to the second document or vice versa.

For example, in many instances, thousands of digital images may be scanned. Requiring a computing system or user to distinguish one document from the next by reading the title page of the document and identifying the individual pages of the document may require the user or computing system to read each page in its entirety. For example, in the event a textbook is scanned, the user or computing system may need to distinguish title pages, table of content pages, publishing information pages, content pages, and appendix pages. In another example, in the event a book is scanned, the user or computing system may need to distinguish title pages, publishing information pages, chapter pages, and content pages. Further, in the event contracts are scanned, a user or computing system may need to identify content pages, blank pages, recorded (stamped) pages, and signature pages. A user or computing system may distinguish these pages based on the content of these pages, but such a process is tedious and time-consuming, and may require extensive processing and memory utilization by computing devices.

Content in a document may be hard to process because of the wide range of formats in which content may be provided, the lengths of the content, the phraseology of the content, and the level of detail of the content. Thus, the various types of content in digitally scanned pages, and the various types of pages of digitally scanned content, may make document and page identification of digital documents extremely labor intensive and difficult to verify. For example, in many implementations, documents may be structured, semi-structured, or unstructured. Structured documents may include specified fields to be filled with particular values or codes with fixed or limited lengths, such as tax forms or similar records. Unstructured documents may fall into particular categories, but have few or no specified fields, and may comprise text or other data of any length, such as legal or mortgage documents, deeds, complaints, etc. Semi-structured documents may include a mix of structured and unstructured fields, with some fields having associated definitions or length limitations and other fields having no limits, such as invoices, policy documents, etc. Techniques that may be used to identify content in some documents, such as structured documents in which optical character recognition may be applied in predefined regions with associated definitions, may not work on semi-structured or unstructured documents.

To address these and other problems of identifying various digital documents and pages, implementations of the systems and methods discussed herein provide for digital document identification via a multi-stage or iterative machine-learning classification process utilizing a plurality of classifiers. Documents may be identified and classified at various iterations according to and identifying the digital document based upon agreement between a predetermined number of classifiers. In many implementations, these classifiers may not need to scan entire documents, reducing processor and memory utilization compared to classification systems not implementing the systems and methods discussed herein. Furthermore, in many implementations, the classifications provided by implementations of the systems and methods discussed herein may be more accurate than simple keyword-based analysis.

Although primarily discussed in terms of individual pages, in many implementations, documents may be multi-page documents. Pages of a multi-page document may be related by virtue of being part of the same document, but may have very different characteristics: for example, a first page may be a title or cover page with particular features such as document identifiers, addresses, codes, or other such features, while subsequent pages may be freeform text, images, or other data. The systems and methods discussed herein may be applied on a page by page basis, and/or on a document by document basis, to classify pages as being part of the same multi-page document and/or to classify documents as being of the same type, source, or grouping (sometimes referred to as a "domain").

Figure 1B:
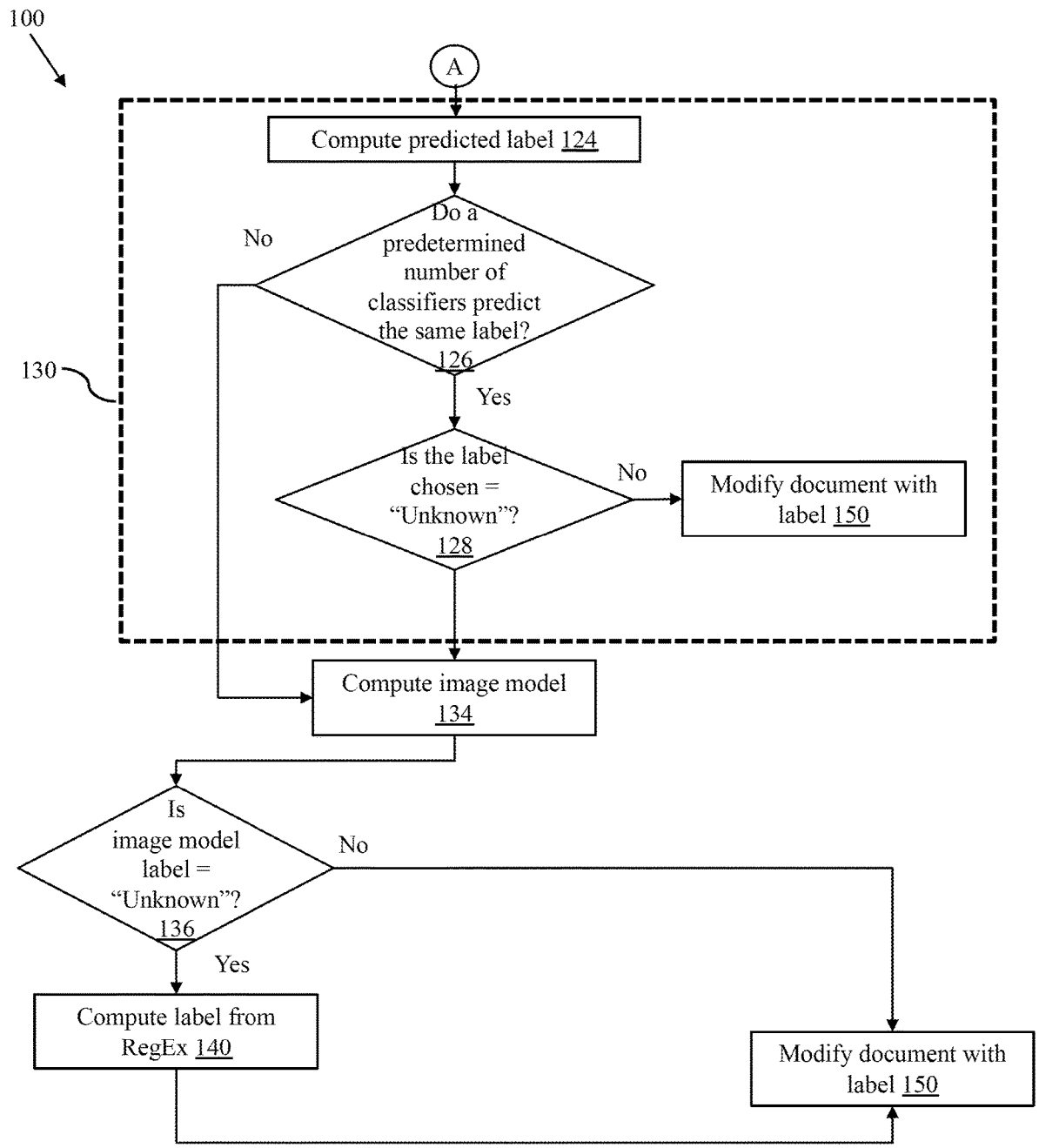

Referring first to FIGS. 1A-1B, depicted is a flow chart of an embodiment of a method 100 for machine learning-based document classification using multiple classifiers. The functionalities of the method may be implemented using, or performed by, the components detailed herein in connection with FIGS. 1-8. In brief overview, a document label may be predicted by various classifiers at step 102. A computing device may determine whether a predetermined number of classifiers agrees on a same label, and whether the agreed-upon label is a meaningful label, or merely a label indicating that the classifiers cannot classify the document at step 106. In response to the predetermined number of classifiers agreeing on a meaningful label, the document may be classified with that label at step 150. In response to the predetermined number of classifiers disagreeing about the document label, or unable to provide a meaningful label, additional classifiers may be employed in an attempt to classify the document at step 112. In the event a predetermined number of the new class of classifiers agrees on a label, and the label is meaningful, the computing device may label the document with that label at step 150. In the event that the new class of classifiers cannot agree on the label, or the document label is not meaningful, classifiers may attempt to label the document given information about a parent document at step 124. In response to a predetermined number of classifiers agreeing on a meaningful label, the document may be classified with that label at step 150. In response to the predetermined number of classifiers disagreeing on the document label, or unable to provide a meaningful label, image analysis may be performed at step 134. In the event the image analysis returns a meaningful label, the document may be labeled with that label at step 150. In the event the image analysis is unable to return a meaningful label, a new classifier may be employed at step 140. In the event the new classifier is able return a meaningful label, the document may be labeled with that label at step 150. In the event the new classifier is unable to return a meaningful label, the document may be labeled with the label that may not be meaningful at step 150.

In step 102, several classifiers may be employed out of a plurality of classifiers in an attempt to label a document received by a computing device. The plurality of classifiers may include a term frequency—inverse document frequency classifier, a gradient boosting classifier, a neural network, a time series analysis, a regular expression parser, and an image comparator. The document received by the computing device may be a scanned document. The scanned document received by the computing device may be an image, or a digital visually perceptible version of the physical document. The digital image may be comprised of pixels, the pixels being the smallest addressable elements in the digital image. The classifiers employed to label the document may each extract and utilize various features of the document.

In some embodiments, the image may be preprocessed before features are learned. For example, the image may have noise removed, be binarized (i.e., pixels may be represented as a '1' for having a black color and a '0' for having a white color), be normalized, etc. Features may be learned from the document based on various analyses of the document. In some embodiments, features may be extracted from the document by extracting text from the document. In other embodiments, features may be extracted from the document based on identifying coordinates of text within the document. In some embodiments, features may be extracted from the document by identifying vertical or horizontal edges in a document. For example, features such as shape context may be extracted from the document. Further, features may be learned from the document based on various analyses of an array based on the document. In some embodiments, an image may be mapped to an array. For example, the coordinates of the image may be stored in an array. In some embodiments, features may be extracted from an array using filters. For example, a Gabor filter may be used to assess the frequency content of an image.

In some implementations, sub-image detection and classification may be utilized as a page or document classifier. For example, in some such implementations, image detection may be applied to portions of a document to detect embossing or stamps upon the document, which may indicate specific document types. Image detection in such implementations may comprise applying edge detection algorithms to identify structural features or shapes and compared to structural features or shapes from templates of embossing or stamps. In some implementations, transformations may be applied to the template image and/or extracted or detected image or structural features as part of matching, including scaling, translation, or rotation. Matching may be performed via a neural network trained on the template images, in some implementations, or using other correlation algorithms such as a sum of absolute differences (SAD) measurement or a scale-invariant feature transformation. Each template image may be associated with a corresponding document or page type or classification, and upon identifying a match between an extracted or detected image or sub-image within a page or document and a template image, the image classifier may classify the page as having the page type or classification corresponding to the template image.

In some embodiments, the classifiers employed during a first iteration may be a first subset of classifiers, the first subset of classifiers including one or more of a neural network, an elastic search model, and an XGBoost model. Employing a first subset of classifiers may be called performing a first mashup at step 110. In other implementations, other classifiers may be included in the first subset of classifiers.

Before the classifiers are employed on the image data, classifiers need to be trained such that the classifiers are able to effectively classify data. Supervised learning is one way in which classifiers may be trained to better classify data.

Figure 5:
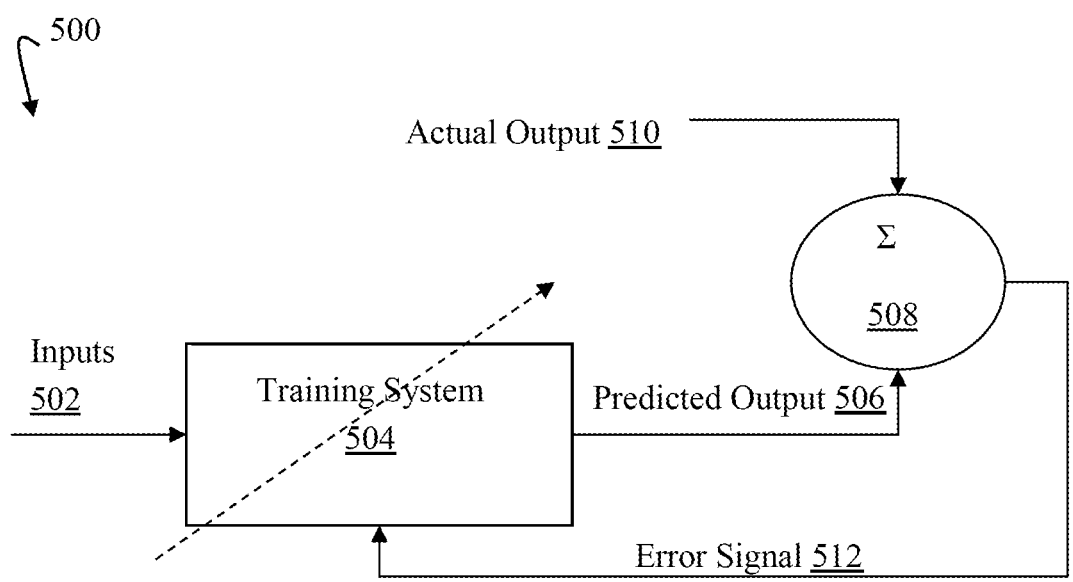
FIG. 5 is a block diagram of an example system using supervised learning, according to some implementations.

Referring to FIG. 5, depicted is a block diagram of an example system using supervised learning 500.

Training system 504 may be trained on known input/output pairs such that training system 504 can learn how to classify an output given a certain input. Once training system 504 has learned how to classify known input/output pairs, the training system 504 can operate on unknown inputs to predict what an output should be and the class of that output.

Inputs 502 may be provided to training system 504. As shown, training system 504 changes over time. The training system 504 may adaptively update every iteration. In other words, each time a new input/output pair is provided to training system 504, training system 504 may perform an internal correction.

For example, the predicted output value 506 of the training system 504 may be compared via comparator 508 to the actual output 510, the actual output 510 being the output that was part of the input/output pair fed into the system. The comparator 508 may determine a difference between the actual output value 510 and the predicted output 506. The comparator 508 may return an error signal 512 that indicates the error between the predicted output 506 and the actual output 510. Based on the error signal 512, the training system 504 may correct itself.

For example, in some embodiments, such as in training a neural network, the comparator 508 will return an error signal 512 that indicates a numerical amount that weights in the neural network may change by to closer approximate the actual output 510. As will be discussed further herein, the weights in the neural network indicate the importance of various connections of neurons in the neural network. The concept of propagating the error through the training system 504 and modifying the training system may be called the back propagation method.

A neural network may be considered a series of algorithms that seek to identify relationships for a given set of inputs. Various types of neural networks exist. For example, modular neural networks include a network of neural networks, each network may function independently to accomplish a sub-task that is part of tasks in a larger set. Breaking down tasks in the manner decreases the complexity of analyzing a large set of data. Further, gated neural networks are neural networks that incorporate memory such that the network is able to remember, and classify more accurately, long datasets. These networks, for example, may be employed in speech or language classifications. In one aspect, this disclosure employs convolutional neural networks because convolutional networks are inherently strong in performing image-based classifications. Convolutional neural networks are suited for image-based classification because the networks take advantage of the local spatial coherence of adjacent pixels in images.

Figure 2:
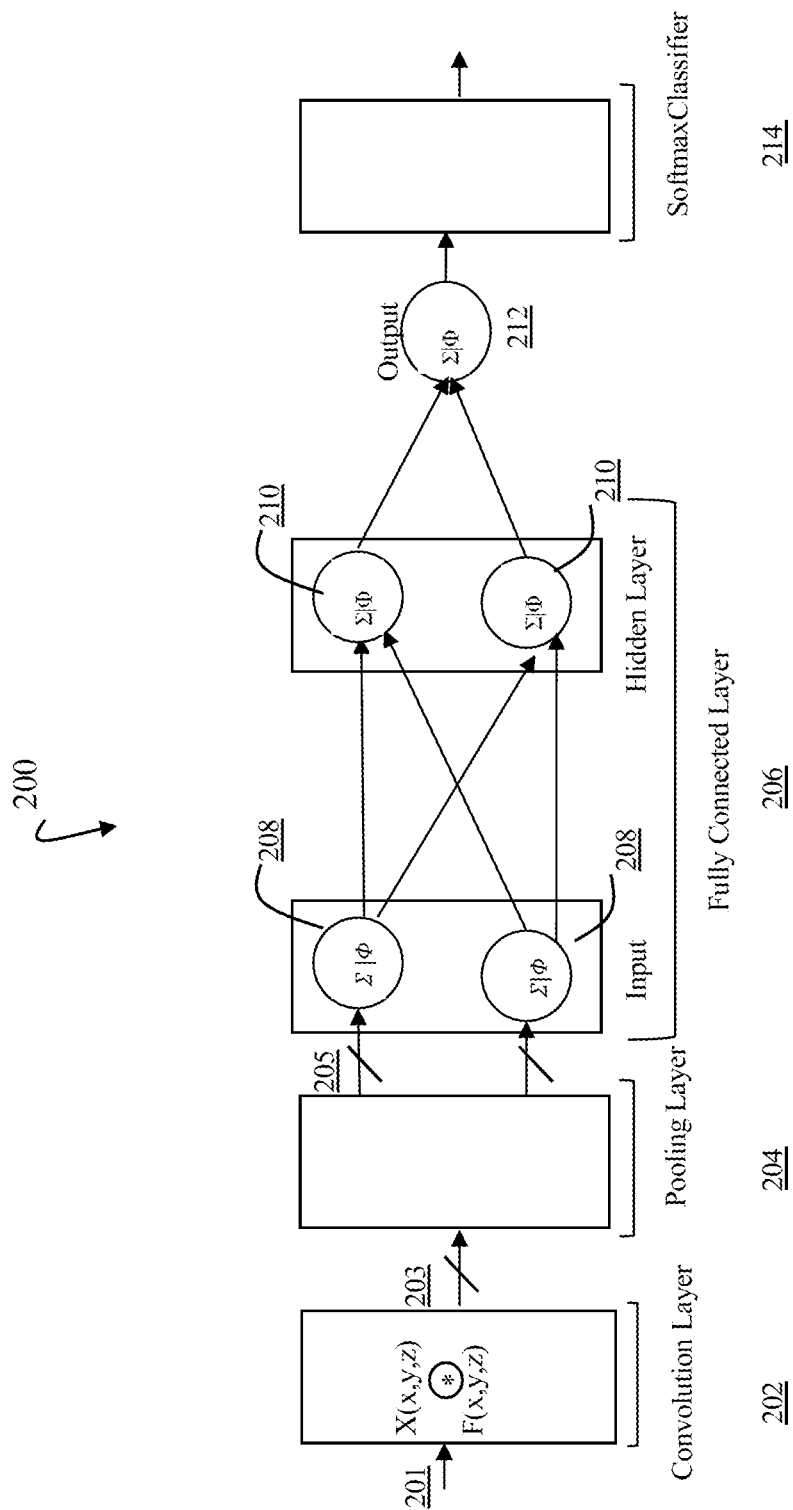
FIG. 2 is a block diagram of an embodiment of a convolutional neural network, according to some implementations.

Referring to FIG. 2, depicted is a block diagram of a convolutional neural network 200, according to some embodiments.

Convolutional layers may detect features in images via filters. The filters may be designed to detect the presence of certain features in an image. In a simplified example, high-pass filters detect the presence of high frequency signals. The output of the high-pass filter are the parts of the signal that have high frequency. Similarly, image filters may be designed to track certain features in an image. The output of the specifically designed feature-filters may be the parts of the image that have specific features. In some embodiments, the more filters that may applied to the image, the more features that may be tracked.

Two-dimensional filters in a two-dimensional convolutional layer may search for recurrent spatial patterns that best capture relationships between adjacent pixels in a two-dimensional image. An image 201, or an array mapping of an image 201, may be input into the convolutional layer 202. The convolutional layer 202 may detect filter-specific features in an image. Thus, convolutional neural networks use convolution to highlight features in a dataset. For example, in a convolutional layer of a convolutional neural network, a filter may be applied to an image array 201 to generate a feature map. In the convolutional layer, the filter slides over the array 201 and the element by element dot product of the filter and the array 201 is stored as a feature map. Taking the dot product has the effect of reducing the size of the array. The feature map created from the convolution of the array and the filter summarizes the presence of filter-specific features in the image. Increasing the number of filters applied to the image may increases the number of features that can be tracked. The resulting feature maps may subsequently be passed through an activation function to account for nonlinear patterns in the features.

Various activation functions may be employed to detect nonlinear patterns. For example, the nonlinear sigmoid function or hyperbolic tangent function may be applied as activation functions. The sigmoid function ranges from 0 to 1, while the hyperbolic tangent function ranges from −1 to 1. These activation functions have largely been replaced by the rectifier linear function, having the formula f(x)=max(0, x). The rectifier linear function behaves linearly for positive values, making this function easy to optimize and subsequently allowing the neural network to achieve high prediction accuracy. The rectifier linear activation function also outputs zero for any negative input, meaning it is not a true linear function.

Thus, the output of a convolution layer 203 in a convolutional neural network is a feature map, where the values in the feature map may have been passed through a rectifier linear activation function. In some embodiments, the number of convolutional layers may be increased. Increasing the number of convolutional layers increases the complexity of the features that may be tracked. In the event that additional convolutional layers are employed, the filters used in the subsequent convolutional layers may be the same as the filters employed in the first convolutional layer. Alternatively, the filters used in the subsequent convolutional layers may be different from the filters employed in the first convolutional layer.

The extracted feature map 203 that has been acted on by the activation function may subsequently be input into a pooling layer, as indicated by 204. The pooling layer down-samples the data. Down-sampling data may allow the neural network to retain relevant information. While having an abundance of data may be advantageous because it allows the network to fine tune the accuracy of its weights, large amounts of data may cause the neural network to spend significant time processing. Down-sampling data may be important in neural networks to reduce the computations necessary in the network. A pooling window may be applied to the feature map 203. In some embodiments, the pooling layer outputs the maximum value of the data in the window, down-sampling the data in the window. Max pooling highlights the most prominent feature in the pooling window. In other embodiments, the pooling layer may output the average value of the data in the window. In some embodiments, a convolutional layer may succeed the pooling layer to re-process the down-sampled data and highlight features in a new feature map.

In some embodiments, at 205, the down-sampled pooling data may be further flattened before being input into the fully connected layers 206 of the convolutional neural network. Flattening the data means arranging the data into a one-dimensional vector. The data is flattened for purposes of matrix multiplication that occurs in the fully connected layers. In some embodiments, the fully connected layer 206 may only have one set of neurons. In alternate embodiments, the fully connected layer 206 may have a set of neurons 208 in a first layer, and a set of neurons 210 in subsequent hidden layers. The neurons 208 in the first layer may each receive flattened one-dimensional input vectors 205. The number of hidden layers in the fully connected layer may be pruned. In other words, the number of hidden layers in the neural network may adaptively change as the neural network learns how to classify the outputs 210.

In the fully connected layers, the neurons in each of the layers 208 and 210 are connected to each other. The neurons are connected by weights. As discussed herein, during training, the weights are adjusted to strengthen the effect of some neurons and weaken the effect of other neurons. The adjustment of each neuron's strength allows the neural network to better classify outputs. In some embodiments, the number of neurons in the neural network may be pruned. In other words, the number of neurons that are active in the neural network adaptively changes as the neural network leans how to classify the output.

After training, the error between the predicted values and known values may be so small that the error may be deemed acceptable and the neural network does not need to continue training. In these circumstances the value of the weights that yielded such small error rates may be stored and subsequently used in testing. In some embodiments, the neural network must satisfy the small error rate for several iterations to ensure that the neural network did not learn how to predict one output very well or accidentally predict one output very well. Requiring the network to maintain a small error over several iterations increases the likelihood that the network is properly classifying a diverse range of inputs.

In the block diagram, 212 represents the output of the neural network. In some embodiments, the output of the fully connected layer is input into a second fully connected later. Additional fully connected layers may be implemented to improve the accuracy of the neural network. The number of additional fully connected layers may be limited by the processing power of the computer running the neural network. Alternatively, the addition of fully connected layers may be limited by insignificant increases in the accuracy compared to increases in the computation time to process the additional fully connected layers.

The output of the fully connected layer 210 may be a vector of real numbers. In some embodiments, the real numbers may be output and classified via any classifier. In one example, the real numbers may be input into a softmax classifier layer 214. A softmax classifier may be employed because of the classifier's ability to classify various classes. Other classifiers, for example the sigmoid function, make binary determinations about the classification of one class (i.e., the output may be classified using label A or the output may not be classified using label A). A softmax classifier uses a softmax function, or a normalized exponential function, to transform an input of real numbers into a normalized probability distribution over predicted output classes. For example, the softmax classifier may indicate the probability of the output being in class A, B, C, etc.

In alternate embodiments, a random forest may be used to classify the document given the vector of real numbers output by the fully connected layer 210. A random forest may be considered the result of several decision trees making decisions about a classification. If a majority of the trees in the forest make the same decision about a class, then that class will be the output of the random forest. A decision tree makes a determination about a class by taking an input, and making a series of small decisions about whether the input is in that class.

Figure 3:
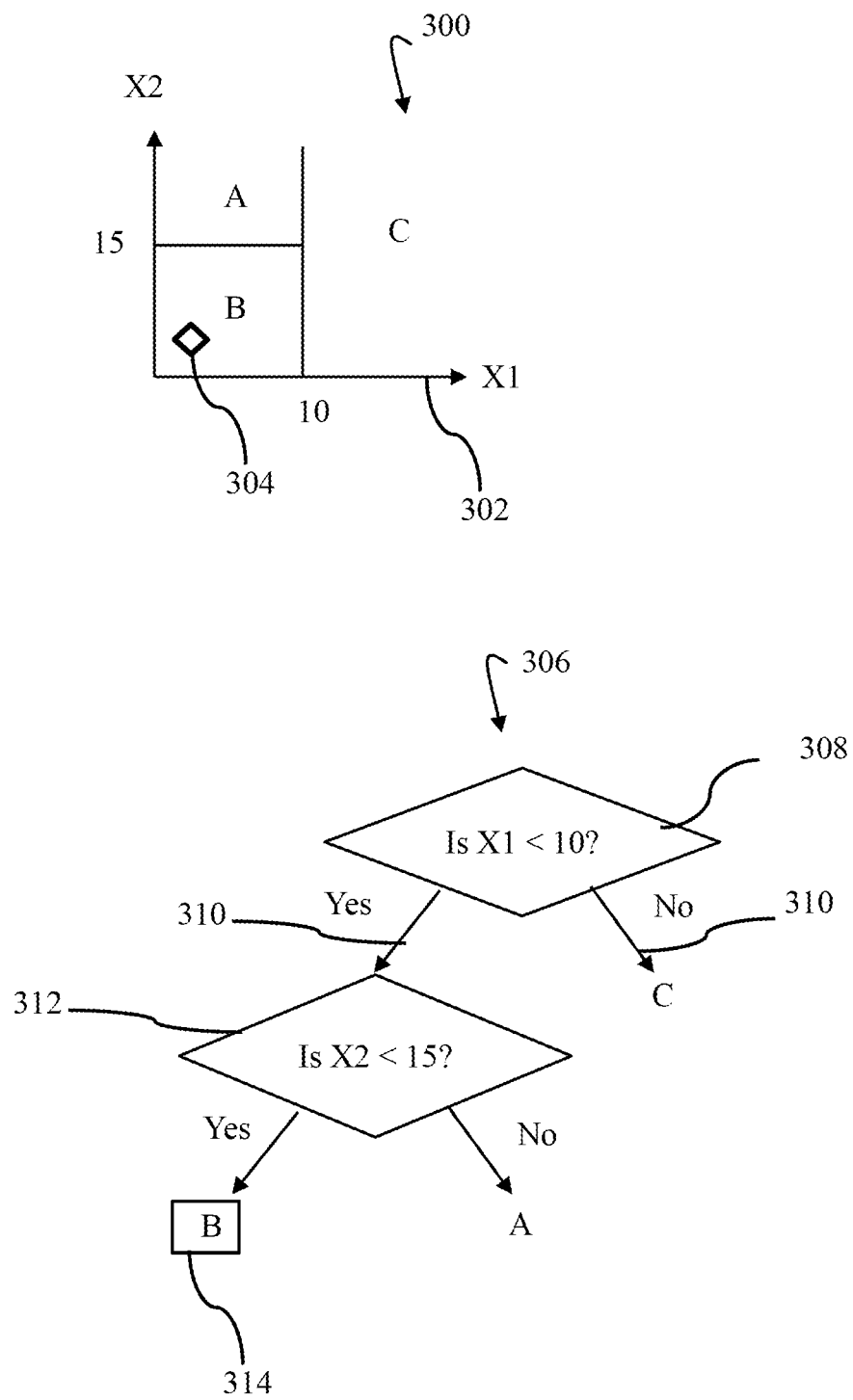
FIG. 3 is a block diagram of an example classification using a decision tree, according to some implementations.

Referring to FIG. 3, depicted is a block diagram of an example of a classification 300 by a decision tree 306.

In the example, three classes exist, A, B and C, as illustrated in the simple two variable graph 302. As is shown by graph 302, data point 304 should be classified in class B. A decision tree may come to the ultimate conclusion that point 304 should be classified in class B.

Decision tree 306 shows the paths that were used to eventually come to the decision that point 304 is in class B. The root node 308 represents an entire sample set and is further divided into subsets. In one embodiment, the root node 308 may represent an independent variable. Root node 308 may represent the independent variable X1. Splits 310 are made based on the response to the binary question in the root node 308. For example, the root node 308 may evaluate whether data point 304 includes an X1 value that is less than 10. According to classification 300, data point 304 includes an X1 value less than 10, thus, in response to the decision based on the root node 308, a split is formed and a new decision node 312 may be used to further make determinations on data point 304.

Decision nodes are created when a node is split into a further sub-node. In the current example, the root node 308 is split into the decision node 312. Various algorithms may be used to determine how a decision node can further tune the classification using splits such that the ultimate classification of data point 304 may be determined. In other words, the splitting criterion may be tuned. For example, the chi-squared test may be one means of determining whether the decision node is effectively classifying the data point. Chi-squared determines how likely an observed distribution is due to chance. In other words, chi-squared may be used to determine the effectiveness of the decision node's split of the data. In alternate embodiments, a Gini index test may be used to determine how well the decision node split data. The Gini index may be used to determine the unevenness in the split (i.e., whether or not one outcome of the decision tree is inherently more likely than the other).

The decision node 312 may be used to make a further classification regarding data point 304. For example, decision node 312 evaluates whether data point 304 has an X2 value that is less than 15. In the current example, data point 304 has an X2 value that is less than 15. Thus, the decision tree will come to conclusion 314 that data point 304 should be in class B.

Returning to FIG. 1A, an elastic search model may be used to compute the predicted label in block 102. An elastic search model is a regression model that considers both ridge regression penalties and lasso regression penalties. The equation for an elastic model may be generally shown in Equation 1 below.

$$y = f(x) + \lambda_2 \|\beta\|^2 + \lambda_1 \|\beta\|, \beta = \Sigma_{j=1}^{P} |\beta_j|$$

Equation 1

As shown in Equation 1, y may be a variable that depends on x. The relationship between x and y may be described by a linear or non-linear function such that y=f(x). In Equation 1, β is a coefficient of the weight of each feature of independent variable x. Thus, β may be summed for p features in x.

Regression may be considered an analysis tool that models the strength between dependent variables and independent variables. In non-linear regression, non-linear approximations may be used to model the relationship between the dependent variable and independent variables. Linear regression involves an analysis of independent variables to predict the outcome of a dependent variable. In other words, the dependent variable may be linearly related to the independent variable. Modifying Equation 1 above to employ linear regression may be shown by Equation 2 below.

$$\hat{y} = \mathrm{armin}_\beta (\|y - X\beta\|^2 + \lambda_2 \|\beta\|^2 + \lambda_1 \|\beta\|), \beta = \Sigma |\beta_j|_{j=1}^{P})$$

Equation 2

In Equation 2, a linear function $\hat{y} = y - X\beta$ describes the relationship between the independent and dependent variables. Linear regression predicts the equation of a line that most closely approximates data points. The equation of the line that most closely approximates the data points may be minimized by the least squares method. The least squares method may be described as the value x used in determining the equation of the line that minimizes the error between the line and the data points. Thus, argmin describes the argument that minimizes the relationship between x and the data points S.

The term $\lambda_2 \|\beta\|^2$ may be described as the Ridge regression penalty. The penalty in ridge regression is a means of injecting bias. A bias may be defined as the inability of a model to capture the true relationship of data. Bias may be injected into the regression such that the regression model may be less likely to over fit the data. In other words, the bias generalizes the regression model more, improving the model's long term accuracy. Injecting a small bias may mean that the dependent variable may not be very sensitive to changes in the independent variable. Injecting a large bias may mean that the dependent variable may be sensitive to changes in the independent variable. The ridge regression penalty has the effect of grouping collinear features.

The lambda in the penalty term may be determined via cross validation. Cross validation is a means of evaluating a model's performance after the model has been trained to accomplish a certain task. Cross validation may be evaluated by subjecting a trained model to a dataset that the model was not trained on.

A dataset may be partitioned in several ways. In some embodiments, splitting the data into training data and testing data randomly is one method of partitioning a dataset. In cases of limited datasets, this method of partitioning might not be advantageous because the model may benefit by training on more data. In other words, data is sacrificed for testing the model. In cases of large datasets, this method of partitioning works well. In alternate embodiments, k-fold cross validation may be employed to partition data. This method of partitioning data allows every data point to be used for training and testing. In a first step, the data may be randomly split into k folds. For higher values of k, there may be a smaller likelihood of bias (i.e., the inability of a model to capture a relationship), but there may be a larger likelihood of variance (i.e., overfitting the model). For lower values of k, there may be a larger bias (i.e., indicating that not enough data may have been used for training) and less variance. In a second step, data may be trained via k-1 folds, where the kth fold may be used for validation.

The term $\lambda_1 \|\beta\|$ may be described as the Lasso regression penalty. The same terms that were described by the Ridge regression penalty, as discussed above, may be seen in the in the Lasso regression penalty. While the Ridge regression penalty had an effect of grouping collinear features, the Lasso regression penalty has the effect of removing features that are not useful. This may be because the absolute value enables the coefficient to reach zero instead of a value asymptotically close to zero. Thus, terms features may be effectively removed.

The elastic model may be employed to determine a linear or nonlinear relationship between input and output data. For example, given a two-dimensional image, a corresponding array may be generated. After training the elastic model, the array may be used as an input for the model, wherein the corresponding outputs may be predicted based on the linear or nonlinear relationship of the inputs and outputs. Given a set of numeric outputs, a classifier may be used to classify the numeric data into a useful label. In some embodiments, as discussed above, a softmax classifier may be used for output classification. In other embodiments, as discussed above, a random forest may be used for output classification.

In some implementations, a term frequency-inverse document frequency (TF-IDF) vector may be utilized to classify documents, using identified or extracted textual data from a candidate image (e.g. from optical character recognition or other identifiers). The TF-IDF vector can include a series of weight values that each correspond to the frequency or relevance of a word or term in the textual data of the document under analysis. To convert the textual data to the TF-IDF vector, each individual word may be identified in the textual data, and the number of times that word appears in the textual data of the document under analysis may be determined. The number of times a word or term appears in the textual data of the document under analysis can be referred to as its term frequency. To determine the term frequency, in some implementations, a counter associated with each word may be incremented for each appearance of the word in the document (if a word is not yet associated with a counter, a new counter may be initialized for that word, and assigned an initialization value such as one). Using the term frequency, a weight value may be assigned to each of the words or terms in the textual data. Each of the weight values can be assigned to a coordinate in the TF-IDF vector data structure. In some implementations, the resulting vector may be compared to vectors generated from template or sample documents, e.g. via a trained neural network or other classifier. Returning to FIG. 1A, in some embodiments, an Extreme Gradient Boosting model ("XGBoost") may be used to compute the predicted label in block 102. A brief overview of gradient boosting may provide insight as to the advantages and disadvantages of XGBoost.

In simplified terms, gradient boosting operates by improving the accuracy of a predicted value of y given an input x applied to the function $f(x)$. For example, if y should be 0.9, but f(x) returns 0.7, a supplemental value can be added to f(x) such that the accuracy of f(x) may be improved. The supplemental value may be determined through an analysis of gradient descent. A gradient descent analysis refers to minimizing the gradient such that during a next iteration, a function will produce an output closer to the optimal value.

Figure 4:
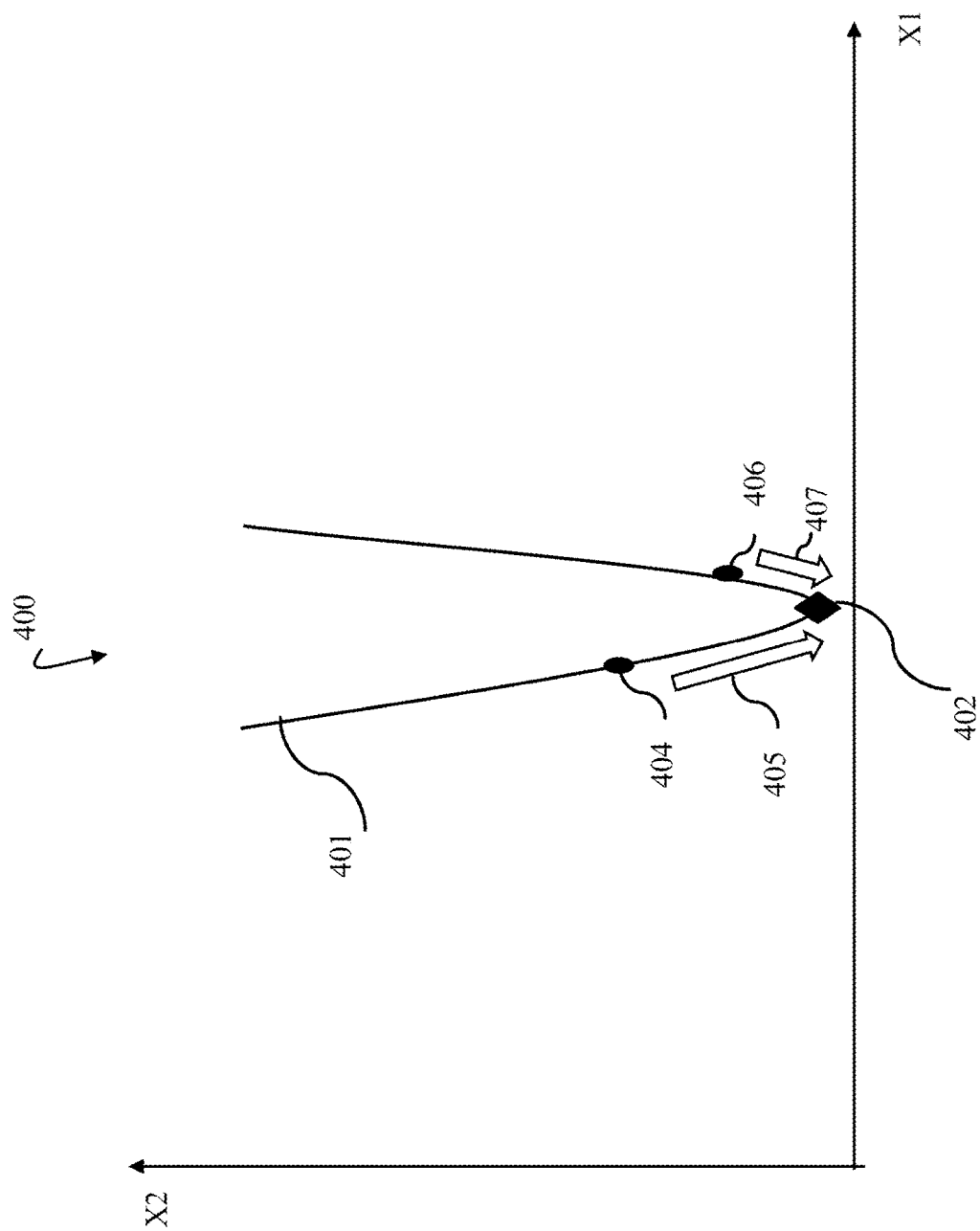
FIG. 4 is a block diagram of an example of the gradient descent method operating on a parabolic function, according to some implementations.

Referring to FIG. 4, depicted is an example 400 of the gradient descent method operating on a parabolic function 401. The optimal value may be indicated by 402. In a first iteration, the equation f(X1) may return a data point on parabola 401 indicated by 404. To optimize data point 404 such that it becomes the value at data point 402, data point 404 may move in the direction of 405. The slope between data point 402 and 404 is negative, thus to move data point 404 in the direction of data point 402, a supplemental value may be added to data point 404 during a next iteration. Adding a supplemental value when the slope is negative may have the effect of moving data point 404 in the direction of 405.

During a next iteration, equation f(X1) with the addition of the supplemental value may return a data point on parabola 401 indicated by 406. To optimize data point 406 such that it becomes the value at data point 402, data point 406 may move in the direction of 407. The slope between data point 402 and 406 is positive, thus, to move data point 406 in the direction of data point 402, a supplemental value may be subtracted from data point 406 during the next iteration. Subtracting a supplemental value when the slope is positive may have the effect of moving data point 406 in the direction of 407. Therefore, data points 404 and 406 must move in the direction opposite of the slope of the parabola 401 to arrive at the desired data point 402. Thus, gradient descent may be performed such that data points may arrive closed to their optimal minimal value. Equation 3 below shows determining the gradient descent of an objective function such that $f(x_n)$ better approximates $y_n$.

$$y_n = f(x_n) + h(x_n)$$
$$h(x_n) = y_n - f(x_n)$$
$$y_n - f(x_n) = -\frac{\delta O(y_n, f(x_n))}{\delta f(x_n)}$$

Equation 3

In Equation 3 above, $y_n$ may be the desired value, $f(x_n)$ may be the function acting on input $x_n$, $h(x_n)$ is the supplemental value at $x_n$ added to improve the output of $f(x_n)$ such that $y_n = f(x_n)$, and $O(y_n, f(x_n))$ is the objective function that is used to optimize $h(x_n)$. Taking the derivative of an objective function with respect to $f(x_n)$ may return the supplemental value that improves $y_n = f(x_n)$. In some embodiments, the objective function may be the square loss function. In other embodiments, the objective function may be the absolute loss function.

Thus, gradient boosting may mean boosting the accuracy of a function by adding a gradient. XGBoost is similar to gradient boosting but the second order gradient is employed instead of the first order gradient, each iteration is dependent on the last iteration, and regularization is employed. Regularization is a means of preventing a model from being over fit. The elastic net model described above employs regularization to prevent a regression model from being over fit. The same parameters, the Ridge regression penalty and Lasso regression penalty, may be incorporated into gradient boosting to improve model generalization. Equation 4 below shows the XGBoost equation, including a Taylor series approximation of the second order derivative and the addition of the Ridge and Lasso regression penalties.

$$\hat{y}_n = \sum_i^n O(y_n, y_n^{(t-1)}) + \left(\frac{\delta O(y_n, y_n^{(t-1)})}{\delta y_n^{(t-1)}}\right) f(x_n) + \left(\frac{\delta^2 O(y_n, y_n^{(t-1)})}{\delta y_n^{(t-1)2}}\right) f(x_n)^2 + \lambda_2 \|\beta\|^2 + \lambda_1 \|\beta\|$$

Equation 4

XGBoost may also be used for classification purposes. For example, given a two-dimensional image, a corresponding array may be generated. In some embodiments, the coordinates of the two-dimensional image may be stored in the two-dimensional array. Features may be extracted from the array. For example, convolution may be used to extract filter-specific features, as described above when discussing the convolutional neural network.

During training, a model $F_i(x)$ may be determined for each class i that may be used in determining whether a given input may be classified as that class. In some embodiments, the probability of an input being labeled a certain class may be determined according to Equation 6 below.

$$P_i(x) = \frac{e^{F_i(x)}}{\sum_i^n e^{F_i(x)}}$$

Equation 6

Where each class may be represented by i and the total number of class may be represented by n. In other words, based on the model that relates the input to a class i, the probability of the input being classified by i may be determined by Equation 6 above. A true probability distribution may be determined for a given input based on the known inputs and outputs (i.e., each class would return '0' while the class that corresponds to the input would return '1'). Further, upon each training iteration, the function $F_i(x)$ may be adapted by the XGBoost model such that function $F_i(x)$ better approximates the relationship between x and y for a given class i. In some embodiments, the objective function implemented in XGBoost may be minimized may be the Kullback-Leibler divergence function.

The decision in step 104 depends on a computing device determining whether a predetermined number of classifiers predict the same label. As described herein, the first subset of classifiers, out of a plurality of classifiers in a first mashup 110, may compute a predicted label according to the classifiers' various methodologies. During the first mashup 110, the predetermined number of classifiers may be a majority of classifiers. For example, given the neural network classifier, the elastic model, and the XGBoost model, the labels of two classifiers may be used in determining whether or not the classifiers agree to a label. In some embodiments, a first number of the selected subset of classifiers may classify the document with a first classification. In alternate embodiments, a second number of the selected subset of classifiers may classify the document with a second classification.

The classifiers may be determined to agree on a label if the classifiers independently select that label from a plurality of labels. In response to the predetermined number of classifiers predicting the same label, the process proceeds to the decision in step 106. In response to the predetermined number of classifiers not predicting the same label, the process proceeds to step 112.

The decision in step 106 depends on a computing device determining whether the label is meaningful. Meaningful labels may be used to identify the pages in a single document and may include, but are not limited to: title page, signature page, first pages, middle pages, end pages, recorded pages, etc. Further, meaningful labels may be used to identify documents from one another and may include, but are not limited to: document 1, document 2, document 3, page 1, page 2, page 3, etc., where a user could use the document labels to map the digitally scanned document to a physical document. In other embodiments, the classifier may return specific labels such as: title of document 1, title of document 2, etc., where the "title" portion of the label would correspond with the title of a physical document. In some embodiments, a classifier may be unable to classify a document, returning a label that is not meaningful. In one example, a label that may be returned that is not meaningful is the label "Unknown." In response to a label that may not be meaningful, the process proceeds to step 112.

In addition to a classifier returning a document label, a classifier may return a confidence score. The confidence score may be used to indicate the classifier's confidence in the classifier's label classification. In some embodiments, the classifier's confidence score may be determined based on the classification. For example, as discussed herein, classifiers may employ a softmax classifier to transform a numerical output produced by a model into a classification and subsequent label. The softmax classifier may produce a classification label based on a probability distribution utilizing the predicted numerical values, over several output classes. A label may be chosen based on the probability distributions such that the label selected may be the label associated with the highest probability in the probability distribution. In one embodiment, the confidence score may be the probability, from the probability distribution, associated with the selected label.

The confidence score associated with the selected label may be compared to a threshold. In response to the confidence score exceeding the threshold, the label may be considered a meaningful label and the process may proceed to step 150. In response to the confidence score not exceeding the threshold, the label selected by the classifier may not be considered meaningful. Instead, the label selected by the classifier may be replaced by, for example, the label "Unknown." In response to the label not being a meaningful label, the process may proceed to step 112.

Each classifier in a plurality of classifiers may have their own threshold value. In some embodiments, a user may define a unique threshold value for each classifier. In alternate embodiments, the threshold value for various classifiers may be the same. In some embodiments, a user may tune the threshold values for each classifier to maximize the accuracy of the classifications. In alternate embodiments, the threshold value may be tuned as a hyper-parameter. In some embodiments, the neural network threshold may be determined to be x (e.g. 50, 55, 60, 65, 75, 90, or any other such value), the elastic net threshold may be determined to be y (e.g. 50, 55, 60, 65, 75, 90, or any other such value), and the XGBoost threshold may be determined to be z (e.g. 50, 55, 60, 65, 75, 90, or any other such value). The thresholds x, y, and z may be identical or may be different (including implementations in which two thresholds are identical and one threshold is different).

In step 150, responsive to a meaningful and agreed-upon label by a predetermined number of classifiers, the computing device may modify the document to include the meaningful and agreed-upon label.

In step 112, several classifiers may be employed out of a plurality of classifiers in an attempt to label the document that was unable to be labeled during the first mashup 110. Thus, a second mashup may be performed. The second mashup may be considered a second iteration. Several classifiers may be employed out of the plurality of classifiers. The number of classifiers employed to label the document in the second mashup 120 may be different from the number of classifiers employed to label the document in the first mashup 110. Further, the classifiers employed in the second mashup 120 may be different from the classifiers employed in the first mashup 110. For example, the classifiers employed in the second mashup 120 may be a second subset of classifiers, the second subset of classifiers including a neural network, as discussed above, an elastic model, as discussed above, an XGBoost model, as discussed above, an Automated machine learning model, and a Regular Expression ("RegEx") classifier, or any combination of these or other third party models.

The second subset of classifiers may be employed to classify the document. In some embodiments, if a classifier implemented in the second subset was used in the first subset, the same features may be used for classification. In other embodiments, a new set of features may be derived for each classifier in the second subset. As discussed above, in some embodiments, features may be learned from various analyses of the document. Similarly, as discussed above, features may be learned from various analyses of an array based on the document. Different classifiers may utilize features that may be the different or the same as other classifiers.

Automated machine learning is a technique that selectively determines how to create and optimize a neural network. In some embodiments, automated machine learning may be provided by a third party system, and may be accessed by an Application Program Interface ("API") or similar interface. An API may be considered an interface that allows a user, on the user's local machine, or a service account on a system to communicate with a server or other computing device on a remote machine. The communication with the remote machine may allow the API to receive information and direct the information to the user or other system from the remote machine. Automated machine learning may employ a first neural network to design a second neural network, the second neural network based on certain input parameters. For example, a user may provide the API with images and labels corresponding to the images. Thus, a user may provide the API with images of a first set of documents and label the images associated with those documents "document 1." Subsequently, a model is created by the automated machine learning system that optimizes text/image classification based on the input data. For example, a model may be trained to classify text/images based on the classes that the model was trained to be recognized. Thus, classes such as title page, signature page, first pages, middle pages, end pages, document 1, document 2, document 3, etc. may be learned from the text/images.

A neural network's design of a neural network may be called a neural architecture search. The first neural network designing the second neural network may search for an architecture that achieves the particular image classification goal that was input as one or more sets of parameters into the first neural network. For example, the first neural network, which may be referred to as a controller, may design a network that optimally labels documents using the provided labels given the types of sample documents and labels input into the first neural network (e.g. by adjusting hyper parameters of the network, selecting different features, etc.). The first neural network designing the second neural network (which may be referred to as a child network, in some implementations) may consider architectures that are more complicated than what a human designing a neural network might consider, but the complex architecture of the second neural network may be more optimized to perform the requested image classification.

In some embodiments, a RegEx classifier may be used to classify the image. A RegEx classifier is a classifier that searches for, and matches, strings. Typically, RegEx classifiers apply a search pattern to alphanumeric characters, and may include specific characters or delimiters (e.g. quotes, commas, periods, hyphens, etc.) to denote various fields or breaks, wildcards or other dynamic patterns, similarity matching, etc.

In some implementations, RegEx classification may also be applied to image processing and classification. As discussed herein, an image may be converted to an array based on a mapping of the pixels to their corresponding coordinates. In some embodiments, the array may be flattened into a one-dimensional vector. Further, the image may be binarized. In other words, a black and white image may be represented by binary values where a '1' represents a black pixel and a '0' represents a white pixel.

A regular expression ("RegEx"), or a sequence of characters that define a specific pattern, may be searched for in the image array or flattened vector. Alternately, a RegEx may be searched for in a subset of the image array. For example, RegExes may be searched for in specific rows and analyzed based on the assumption that an analysis of pixels in the same row may be more accurate as pixels in the same row are likely more correlated than pixels across the entire image. In some embodiments, in response to the image data matching a RegEx, a k-length array of k RegExes may be determined, where the i-th element in the array is the number of times the i-th RegEx matched the image. Thus, in some embodiments, if a RegEx was defined as a pattern that represented a specific feature, features may be extracted from an image based on the features matching RegExes. Subsequently, a classification of the image may be based on the features extracted and/or the frequency of the extracted feature of the image. In a simplified example, a RegEx searching for the string "document 1" may be searched for in an image. In response texting matching the regex string "document 1", it may be determined that the image relates to document 1. Thus, the image may be classified as "document 1".

The image may be classified as document 1 based on rule classification. Thus, a rule may exist such that the rule dictates, that, upon a one or more specific matching RegExes, the document must be identified with a certain label. In a simplified example, a rule may dictate: "in response to the strings 'signature' and 'here', the page must be labeled as a signature page." Thus, RegExes may be created that search for "signature" and "here" and if those strings are found in the document, the document may be labeled as a signature page.

In some embodiments, RegExes may be determined by the user. In alternate embodiments, regexes may be generated. For example, evolutionary algorithms may be used to determine relevant RegExes in a document.

Evolutionary algorithms operate by finding successful solutions based on other solutions that may be less successful. In one example, a population, or a solution set, may be generated. A RegEx may be considered an individual in the population. Different attributes of the solution set may be tuned. For example, the length of the RegEx and the characters that the RegEx searches for may be tuned. In some embodiments, the population may be randomly generated. In other embodiments, the population may be randomly generated with some constraints. For example, in response to binarizing the data, the characters that may be used in solution set may be limited to '1' and '0'.

Further, a fitness function may be created to evaluate how individuals in the population are performing. In other words, the fitness function may evaluate the generated RegExes to determine if other RegExes may be better at classifying the image. In some embodiments, fitness functions may be designed to suit particular problems. The fitness function may be used in conjunction with stopping criteria. For example, in response to a predetermined number of regexes performing well, the training of the evolutionary algorithm, in other words, the creation and tuning of new RegExes, may terminate.

In a simplified example, the number of times that a particular RegEx has been matched to text in the document may be counted and summed. RegExes that have been identified in a document may be kept, and RegExes without any matches, or where the number of matches associated with that RegEx does not meet a certain threshold, may be discarded. Subsequently, attributes from the RegExes that have been matched may be mixed with other matched RegExes.

The attributes that are matched may be tuned. For example, given a RegEx that has been successfully matched, an attribute from that RegEx, for example the first two characters in the RegEx string, may be mixed with attributes of a second successfully matched RegEx. In some embodiments, mixing the attributes of successfully matched RegExes may mean concatenating the attributes from other successfully matched RegExes to form a new RegEx. In other embodiments, mixing the attributes of successfully matched RegExes may mean randomly selecting one or more portions of the attribute and creating a new RegEx of randomly selected portions of successfully matched RegExes. For example, one character from the first two characters of ten successfully matched RegExes may be randomly selected and randomly inserted into a new RegEx of length ten.

The decision in step 114 depends on a computing device determining whether a predetermined number of classifiers predict the same label. As described herein, the second subset of classifiers, out of a plurality of classifiers in a second mashup 120, may compute a predicted label according to the classifiers' various methodologies. During the second mashup 120, the predetermined number of classifiers may be a minority of classifiers, the number of minority classifiers being at least greater than one classifier. For example, given the neural network classifier, the elastic search model, the XGBoost model, the automatic machine learning model, and the RegEx classifier, the labels of two classifiers may be used in determining whether or not the classifiers agree on a label. In some embodiments, a first number of the selected subset of classifiers may classify the document with a first classification. In alternate embodiments, a second number of the selected subset of classifiers may classify the document with a second classification.

The classifiers may be determined to agree on a label if the classifiers independently select that label from a plurality of labels. In response to the predetermined number of classifiers predicting the same label, the process proceeds to the decision in step 116. In response to the predetermined number of classifiers not predicting the same label, the process proceeds to step 124.

The decision in step 116 depends on a computing device determining whether the label is meaningful. As discussed above, meaningful labels may include: title page, signature page, first pages, middle pages, end pages, recorded pages, document 1, document 2, document 3, page 1, page 2, page 3, etc. In response to a label that may not be meaningful, the process proceeds to step 124.

In addition to a classifier returning a document label, as discussed above, a classifier may return a confidence score. The confidence scores may be compared to a threshold. In response to the confidence score exceeding the threshold, the label may be considered a meaningful label and the process may proceed to step 150. In response to the confidence score not exceeding the threshold, the label selected by the classifier may not be considered meaningful. Instead, the label selected by the classifier may be replaced by, for example, the label "Unknown." In response to the label not being a meaningful label, the process may proceed to step 124.

As discussed above, each classifier in a plurality of classifiers may have their own threshold value. In some embodiments, classifiers employed in both the first mashup 110 and the second mashup 120 may have the same threshold value. In alternate embodiments, classifiers employed in both the first mashup 110 and the second mashup 120 may have different threshold values. In some embodiments, the threshold value may be tuned as a hyper-parameter. In some embodiments, the threshold values for the second mashup may include a neural network threshold value set to x, an elastic net threshold value set toy, an XGboost threshold value set to z, an automatic machine learning threshold value set to a, and a RegEx threshold value set to b (each of which may include any of the values discussed above for thresholds x, y, and z, and may be different from or identical to any other thresholds). In some implementations, a threshold value b for a RegEx classifier may be set to a higher value than other classifier thresholds, such as 95 or 100. In some embodiments, in response to RegEx confidence scores not meeting the high threshold value b, more RegExes may be added such that the document is more thoroughly searched for matching expressions.

In some implementations, fuzzy logic may be implemented separately or as part of the RegEx to identify partial matches of the string to filters or expressions. The fuzzy logic output may comprise estimates or partial matches and corresponding values, such as "60% true" or "40% false" for a given match of a string to a filter or expression. Such implementations may be particularly helpful in instances where the RegEx fails to find an exact match, e.g. either 100% matching the filter (e.g. true) or 0% matching (e.g. false). The fuzzy logic may be implemented serially or in parallel with the RegEx at step 140 in some implementations, and in some implementations, both exact and fuzzy matching may be referred to as RegEx matching.

In step 150, responsive to a meaningful and agreed-upon label by a predetermined number of classifiers, the computing device may modify the document to include the meaningful and agreed-upon label.

In step 124, several classifiers may be employed out of a plurality of classifiers in an attempt to label the document that was unable to be labeled during the second mashup 120 or the first mashup 110. Thus, a third mashup 130 may be performed. The third mashup 130 may be considered a third iteration. Several classifiers may be employed out of the plurality of classifiers. The number of classifiers employed to label the document in the third mashup 130 may be different from the number of classifiers employed to label the document in second mashup 120 and the first mashup 110. Further, the classifiers employed in the third mashup 130 may be different from the classifiers employed in the second mashup 120 and the first mashup 110. For example, the classifiers employed in the third mashup 130 may be a third subset of classifiers, the third subset of classifiers including a neural network, as discussed above, an elastic search model, as discussed above, an XGBoost model, as discussed above, an automated machine learning model, as discussed above, and a Regular Expression (RegEx) classifier, as discussed above.

The third subset of classifiers may be employed to classify the document. In some embodiments, features used in any of the preceding subsets may be used again during the third mashup 130. In other embodiments, a new set of features may be derived for each classifier in the third subset.

As discussed above, in some embodiments, features may be learned from various analysis of the document. Similarly, as discussed above, features may be learned from various analysis of an array based on the document. Different classifiers may utilize features that may be the different or the same as other classifiers.

In addition to the features learned from the document, features from a parent document may be learned and input into the various classifiers in the third mashup 130. In some embodiments, the parent document may be a document that has been classified and labeled. For example, document 1 may successfully be classified and labeled as document 1. Document 2, immediately following document 1, may have not been successfully classified during either the first or second mashups 110 and 120 respectively. Thus, features from document 1 may be learned from document 1 to help improve the classification of document 2 in the third mashup 130. In a simplified example, page t of a book may provide a classifier context as to what is on page t+1 of a book. In other words, features from a parent document may be considered historic inputs. Historic inputs may improve the classification likelihood of the document being classified in the third mashup 130. Thus, a time series analysis may be performed by incorporating the features of the parent document. Incorporating historic data may provide improve the ability of the third mashup 130 to classify and label the document because it is assumed that, for example, pages within the same document are serially autocorrelated. In other words, there may be correlations between the same features over time.

In some embodiments, the selected classifiers for the third mashup 130 may be the same as the selected classifiers in the preceding mashups. In alternate embodiments, the same selected classifiers for the third mashup 130 may be retrained because of the incorporation of historic data.

For example, as described herein, RegEx classifiers operate based on pattern matching. Thus, historic data, such as successful RegExes, about a previously classified image and that image's associated classification, may help the RegEx classifier in mashup 130 to classify the document. For example, in addition to teaching the RegEx classifier how to search for RegExes in the current document, the RegEx classifier may be trained to search for specific RegExes based on the parent document. Thus, knowing the RegExes used to successfully classify a parent document may help the RegEx classifier classify the current document because the strings that the RegEx searches for in the current document may be similar to the parent document based on the assumption that time series data may be serially correlated.

The decision in step 126 depends on a computing device determining whether a predetermined number of classifiers predict the same label. As discussed herein, the third subset of classifiers, out of a plurality of classifiers in a third mashup 130, may compute a predicted label according to the classifiers' various methodologies. During the third mashup 130, the predetermined number of classifiers may be a majority of classifiers. For example, given a mashup including five classifiers, such as the neural network classifier, the elastic search model, the XGBoost model, the automated machine learning model, and the RegEx classifier, the labels of a majority (e.g. three, four, or five) classifiers may be used in determining whether or not the classifiers agree on a label. In some embodiments, a first number of the selected subset of classifiers may classify the document with a first classification. In alternate embodiments, a second number of the selected subset of classifiers may classify the document with a second classification. Similarly, the total number of majority votings may vary from one set of classifiers to another. In some cases, the majority can be decided by just one vote, and by two votes in another case.

The classifiers may be determined to agree on a label if the classifiers independently select that label from a plurality of labels. In response to the predetermined number of classifiers predicting the same label, the process proceeds to the decision in step 128. In response to the predetermined number of classifiers not predicting the same label, the process proceeds to step 134.

The decision in step 128 depends on a computing device determining whether the label is meaningful. As discussed above, meaningful labels may include: title page, signature page, first pages, middle pages, end pages, recorded page, document 1, document 2, document 3, etc. In response to a label that may not be meaningful, the process proceeds to step 134.

In addition to a classifier returning a document label, as discussed above, a classifier may return a confidence score. The confidence scores may be compared to a threshold. In response to the confidence score exceeding the threshold, the label may be considered a meaningful label and the process may proceed to step 150. In response to the confidence score not exceeding the threshold, the label selected by the classifier may not be considered meaningful. Instead, the label selected by the classifier may be replaced by, for example, the label "Unknown". In response to the label not being a meaningful label, the process may proceed to step 134.

As discussed above, each classifier in a plurality of classifiers may have their own threshold value. In some embodiments, classifiers employed in the preceding mashups may have the same threshold value. For example, the thresholds employed in the third mashup 130 may be the same as the thresholds employed in the second mashup 120. In alternate embodiments, classifiers employed in the preceding mashups may have different threshold values. In some embodiments, the threshold value may be tuned as a hyper-parameter.

In step 150, responsive to a meaningful and agreed-upon label by a predetermined number of classifiers, the computing device may modify the document to include the meaningful and agreed-upon label.

In step 134, several classifiers may be employed out of a plurality of classifiers in an attempt to label the document that was unable to be labeled during the previous mashups. In some embodiments, one or more image analyses or classifications may be performed. An image analysis or classification may be considered the recognition of characteristics in an image and classification of the characteristics and/or the image according to one or more of a plurality of predetermined categories.

Image segmentation may be used to locate objects and boundaries, for example, lines and curves, in images. Pixels may be labeled by one or more characteristics, such as color, intensity or texture. Pixels with similar labels in a group of pixels may be considered to share the same visual features. For example, if several pixels in close proximity share the same intensity, then it may be assumed that those pixels may be closely related. Thus, the pixels may be a part of the same character, or, for example, the same curve comprising a portion of a single character. Clusters of similar pixels may be considered image objects.

In another embodiment, edge detection (e.g. Sobel filters or similar types of edge detection kernels) may be employed to extract characters and/or structural features of the document or a portion of the document, such as straight lines or boxes indicating fields within the document, check boxes, stamps or embossing, watermarks, or other features. Structural features of the document or a portion of the document may be compared with one or more templates of structural features to identify similar or matching templates, and the document may be scored as corresponding to a document from which the template was generated. For example, in one such embodiment, a template may be generated from a blank or filled out form, identifying structural features of the form such as boxes around each question or field on the form, check boxes, signature lines, etc. Structural features may be similarly extracted from a candidate document and compared to the structural features of the template (including, in some implementations, applying uniform scaling, translation, or rotation to the structural features to account for inaccurate captures). Upon identifying a match or correspondence between the candidate document and the template, the candidate document may be classified as the corresponding form.

In another embodiment, a convolutional neural network may be used to extract salient features from an image or portion of an image of a document, and process a feature vector according to a trained network. Such networks may be trained on document templates, as discussed above. In still other embodiments, a support vector machine (SVM) or k-Nearest Neighbor (kNN) algorithm may be used to compare and classify extracted features from images.

Furthermore, in many implementations, multiple image classifiers may be employed in serial or in parallel (e.g. simultaneously by different computing devices, with results aggregated), and a voting system may be used to aggregate the classifications, as discussed above. For example, in some implementations, if a majority of the image classifiers agree on a classification, an aggregated image classifier classification may be recorded; this aggregated image classifier classification may be further compared to classifications from other classifiers (e.g. XGBoost, automated machine learning, etc.) in a voting system as discussed above. In other implementations, each image classifier vote may be provided for voting along with other classifiers in a single voting or aggregation step (e.g. identifying a majority vote from votes from among classifiers).

In some embodiments, optical character recognition may be used to recognize characters in an image. For example, the image objects, or clusters of related pixels, may be compared to characters in a character and/or font database. Thus, the image objects in the document may be matched to characteristics of characters. For example, an image object may comprise part of a curve that resembles the curve in the lower portion of the letter 'c'. A computing device may compare the curve with curves in other characters via a database. Subsequently, a prediction of the character may be determined based on related image objects. For example, after comparing image objects in a character database, the computing device may determine that the character is a 'c'.

A computing device may predict each character and/or object in an image. In some embodiments, a computing device may be able to classify words based on an image. In some embodiments, a dictionary may be employed to check the words extracted from the document. In a simple example, the computing device may determine a string of characters extracted from the document to be "dat". A dictionary may be employed to check the string "dat" and it may be subsequently determined that the string "cat" instead of "dat" should have been found based on the curves of characters. In other words, a dictionary may be a means of checking that the predicted character, based on the image object, was accurately determined.

The document may be classified based on the characters and strings determined by the computing device. In some embodiments, topic modeling may be performed to classify the documents based on the determined strings in the document. For example, a latent semantic analysis ("LSA") may be performed. LSA may determine the similarity of strings by associating strings with content and/or topics that the strings are frequently used to describe. In a simple example, the word "client" may be associated with the word "customer" and receive a high string similarity score. In a separate example, the words "Notebook Computer" would receive a low string similarity score in the context of "The Notebook", the 2004 movie produced by Gran Via. A score between −1 and 1 may be produced, where 1 indicates that the strings are identical in their context, while −1 means there is nothing that relates the strings to that content.

LSA performs string-concept similarity analysis by identifying relationships between strings and concepts in a document. LSA evaluates the context of strings in a document by considering strings around each string. LSA includes constructing a weighted term-document matrix, performing singular value decomposition on the matrix to reduce the matrix dimension while preserving string similarities, and subsequently identifying strings related to topics using the matrix.

LSA assumes that the words around a topic may describe the topic. Thus, in the computer example described above, the topic "Notebook Computer" may be surrounded by words that describe technical features. In contrast, the topic "The Notebook" movie may be surrounded by dramatic or romantic words. Therefore, if a computing device determined that one string described the "Notebook Computer" and a different string described "The Notebook" movie, LSA may enable the computing device to determine that the strings are describing different topics.

In some embodiments, the singular value decomposition matrix used in LSA may be used for document classification. For example, the vectors from the singular value decomposition matrix may be compared to a vector corresponding to different classes. Cosine similarity may be applied to the vectors such that an angle may be calculated between the vectors in the matrix and the vector comprising classes. A ninety-degree angle may express no similarity, while total similarity may be expressed by a zero degree angle because the strings would completely overlap. Thus, a document may be classified by determining the similarity of the topics and/or strings in the document and the classes. For example, if a document topic is determined to be "document 1" based on LSA, the document may be classified as "document 1" because the cosine similarity analysis would show that the topic "document 1" completely overlaps with the label "document 1."

The decision in step 136 depends on a computing device determining whether the label, determined by the image classification, is meaningful. As discussed above, meaningful labels may include: title page, signature page, first pages, middle pages, end pages, recorded pages, document 1, document 2, document 3, page 1, page 2, page 3, etc. In response to a label that may not be meaningful, the process proceeds to step 140.

In addition to the image classification returning a label, as discussed above, a confidence score may be associated with the returned label. The confidence score may be compared to a threshold. In response to the confidence score exceeding the threshold, the label may be considered a meaningful label and the process may proceed to step 150. In response to the confidence score not exceeding the threshold, the label selected by the classified may not be considered meaningful. Instead, the label selected by the classifier may be replaced by, for example, the label "Unknown". In response to the label not being a meaningful label, the process may proceed to step 140.

As discussed above, each classifier in a plurality of classifiers may have their own threshold value. In some embodiments, the threshold value may be tuned as a hyperparameter. In some embodiments, the threshold value for image classification may be a value d (e.g. 50, 60, 70, 80, or any other such value, in various embodiments).

In step 150, responsive to a meaningful and agreed-upon label by a predetermined number of classifiers, the computing device may modify the document to include the meaningful and agreed-upon label.

In step 140, several classifiers may be employed out of a plurality of classifiers in an attempt to label the document that was unable to be labeled during the previous iterations. In some embodiments, an untrained RegEx may be employed. As discussed above, regex classifiers search for and match strings. In some embodiments, the regex classifier may be trained. For example, evolutionary algorithms may be employed to generate regexes, the generated regexes being more likely to be found in the document. In alternate embodiments, a large number of regexes may be employed in an attempt to classify the document. The regexes may not necessarily be tuned such that the expressions are more likely to be found in the document. A large number of untrained regexes may be used to discourage any likelihood of the trained regexes being overly trained. Employing untrained regexes may be analogous to the concept of injecting bias into a model in the form of regularization, as discussed above.

A document may be searched for RegExes. In some embodiments, in response to a document matching RegExes to document labels, the document may be classified with that label. In alternate embodiments, a document may be classified with a label in response to RegExes being matched to the label a predetermined number of times. For example, a predetermined number may be set to two. If a document matches one RegEx to a label, the document may not be classified with that label because the number of RegExes did not meet or exceed the predetermined number two. As discussed above, a confidence score may be associated with the labeled data. The confidence score may indicate the likelihood that the document was classified correctly.

In step 150, the document may be modified with the label determined from the Untrained RegEx classifier. In some embodiments, the document may be labeled with a meaningful label such as title page, signature page, first pages, middle pages, end pages, recorded pages, document 1, document 2, document 3, page 1, page 2, page 3, etc. A document may be labeled with this label in the event that the RegEx classifier matched text within the document to a meaningful label.

In alternate embodiments, a document may be labeled a label that may not be meaningful. For example, a document may be labeled "Unknown". A document may be labeled with a label that may not be meaningful in the event that the RegEx classifier did not match text within the document to a meaningful label.

Alternatively, the document may be labeled with a label that may not be meaningful in the event that the confidence score associated with the RegEx classification did not exceed or meet the RegEx threshold value. In some embodiments, the RegEx threshold value is set to 100. Thus, a document may be labeled "Unknown" in the event the RegEx's confidence score is not 100.

The systems and methods discussed herein provide a significant increase in accuracy compared to whole document natural language processing. For example, in one implementation of the systems discussed herein, nine stacks of documents were classified with an average accuracy of 84.4%.

Figure 6:
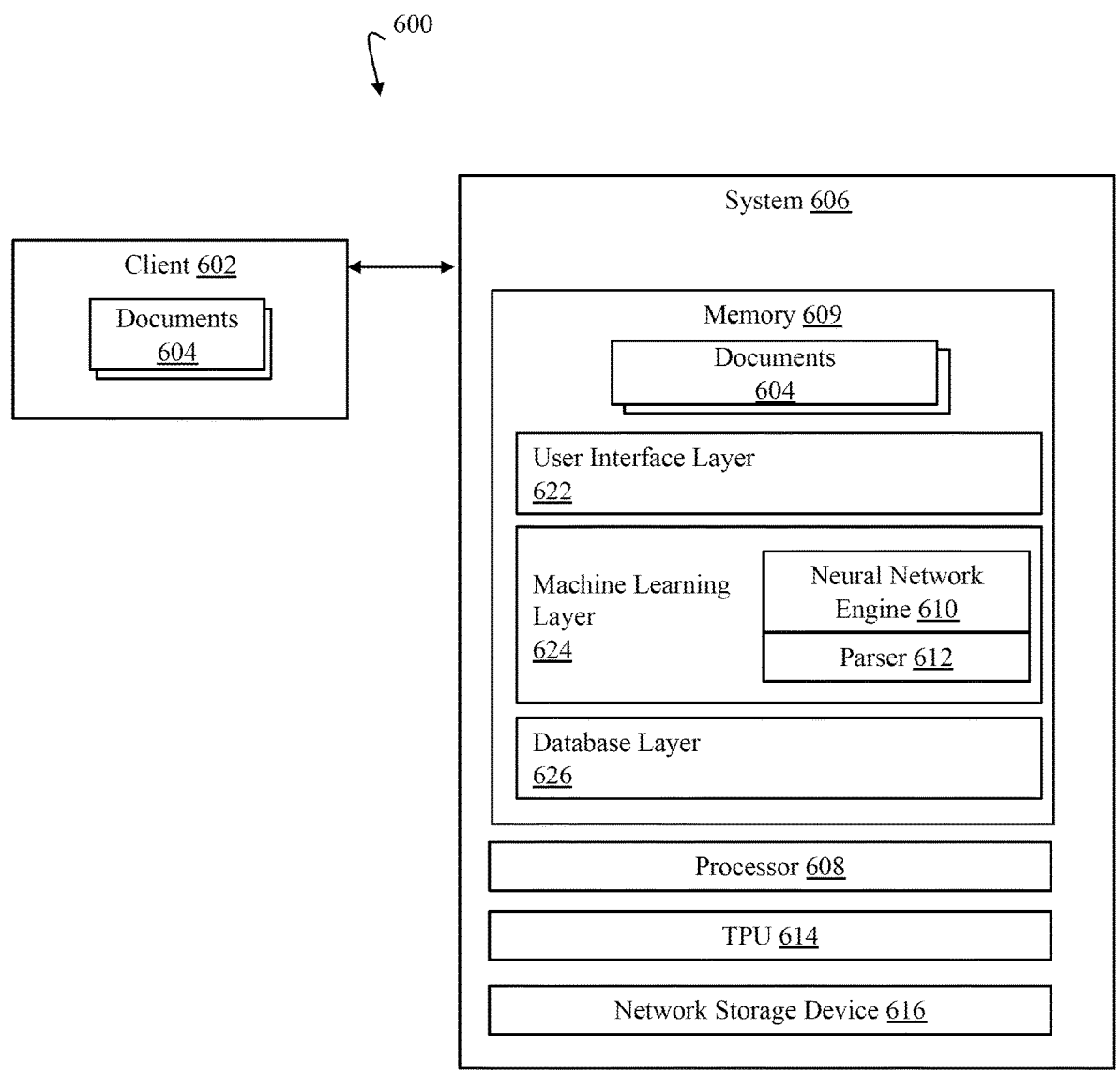
FIG. 6 is a block diagram of a system classifying received documents, according to some implementations.

Referring to FIG. 6, depicted is a block diagram of system 600 classifying received documents. Client 602 may request a stack of documents 604 to be classified. Client 602 may also request that relevant content associated with the stack of documents 604 be extracted. The documents 604 may be documents that may have been scanned. In some embodiments, the scanned documents 604 may be images or digital visually perceptible versions of the physical documents.

System 606 may receive the stack of documents 604 from client 602 and both classify and extract content from the documents 604. In some configurations, memory 609 in system 606 may store documents 604. Memory 609 may be any memory suitable for storing program instructions and data including all forms of non-volatile memory, media and memory devices, including by way of example semiconductor memory devices, e.g., EPROM, EEPROM, and flash memory devices; magnetic disks, e.g., internal hard disks or removable disks, magneto optical disks; and CD ROM and DVD-ROM disks.

In other configurations, the system 606 may transmit the documents to a database (e.g., a third party database, or other database) to be stored. The system may access the database using database APIs. Memory 609 may be used to store instructions relating to calling databases using database APIs (e.g., database layer 626). The databases may also store trained classifiers, trained searching models, thresholds, rules, rule conditions, and the like.

A user may configure the system 606 by interacting with a user interface. For example, a user may configure various thresholds, select classifiers and/or searching models to be implemented via system 606, and the like. In some configurations, the system 606 receives the user's instructions and/or configurations via an API. That is, a user (on a device not shown) may configure the system 606 using an API. The system 606 may store instructions for accessing the user interface in memory 609 via user interface layer 626.

A processor 608 may be the logic in a device (e.g., system 606) that receives software instructions. A central processing unit ("CPU") may be considered any logic circuit that responds to and processes instructions. Thus, CPUs provide flexibility in performing different applications because various instructions may be performed by the CPU. One or more algorithmic logic units ("ALU") may be incorporated in processors to perform necessary calculations in the event an instruction requires a calculation be performed. When a CPU performs a calculation, it performs the calculation, stores the calculation in memory, and reads the next instruction to determine what to do with the calculation.

A different type of processor 608 utilized in system 606 may be the graphics processing unit ("GPU"). A system 606 may include both GPU and CPU processors 608. A GPU is a specialized electronic circuit designed to quickly perform calculations and access memory. As GPUs are specifically designed to perform calculations quickly, GPUs may have many ALUs allowing for parallel calculations. Parallel calculations mean that calculations are performed more quickly (e.g., in parallel to other tasks being performed by the processor 608). GPUs, while specialized, are still flexible in that they are able to support various applications and software instructions. As GPUs are still relatively flexible in the applications they service, GPUs are similar to CPUs in that GPUs perform calculations and subsequently store the calculations in memory as the next instruction is read. In some configurations, processor 608 may include a neural network engine 610 and parser 612. In other configurations, the system 606 may access the neural network engine 610 and the parser 612 using an API. That is, each machine learning model may have an associated API that may be used to call the machine learning model. Instructions for invoking various machine learning models may be stored in memory 609 (e.g., the machine learning layer 624). The various machine learning models include the classifiers and/or searching algorithms. For example, machine learning models include elastic search models, neural networks (including convolutional neural networks, deep neural networks, word2vec neural networks, doc2vec neural networks), XGBoost models, AutoML models, fuzzy models (including RegEx classifiers), LDA models, LSA models, n-gram models, WMD models, and the like.

Employing APIs to invoke machine learning models allows the machine learning models (e.g., classifiers, searching models) to be implemented in different environments. For example, the machine learning models may be implemented on cloud or on premise environments. In addition, machine learning models may be added (e.g., by a user using a user interface recognized by the user interface layer 622).

Processor 608 may call machine learning models using the instructions stored in memory 609, access databases using the instructions stored in memory 609, and may receive information from a user interface using the instructions stored in memory 609. The layers (e.g., user interface layer 622, machine learning layer 624, and database layer 626) may be considered to be independent and agnostic to the mechanics of the system 606. In addition, the independence derived from using APIs facilitates scalability of system 606.

A neural network engine 610 is an engine that utilizes the inherent parallelisms in a neural network to improve and speed up the time required for calculations. For example, generally, processors performing neural network instructions perform the neural network calculations sequentially because of the dependencies in a neural network. For example, the inputs to one neuron in a network may be the outputs from the previous neuron. In other words, a neuron in a first layer may receive inputs, perform calculations, and pass the output to the next neuron. However, many of the same computations are performed numerous time during the execution of the neural network. For example, multiplication, addition and executing transfer function are performed at every neuron. Further, while neurons within the same layer may be dependent on one another, neurons are independent from neurons in other layers. Thus, various neural network engines 610 may capitalize on the parallelisms of a neural network in various ways. For example, every addition, multiplication and execution of the transfer function may be performed simultaneously for different neurons in different layers.

A parser 612 may be a data interpreter that breaks data into smaller elements of data such that the smaller elements of data may be processed faster or more accurately. For example, a parser 612 may take a sequence of text and break the text into a parse tree. A parse tree is a tree that may represent the text based on the structure of the text. A parse tree may be similar in structure to the decision tree illustrated in FIG. 3, but decisions may not be performed. Instead, a parse tree may merely be used to show the structure of data to simplify the data.

In addition to CPUs and GPUs, system 606 may additionally have a tensor processing unit ("TPU") 614. TPU 614, while still a processor like a CPU and GPU, is an Artificial Intelligence application-specific integrated circuit, such as those circuits manufactured by Google of Mountain View, California TPUs do not require any memory as their purpose is to perform computations quickly. Thus, TPU 614 performs calculations and subsequently passes the calculations to an ALU or outputs the calculations such that more calculations may be performed. Thus, TPUs may be faster than their counterparts CPUs and GPUs.

A network storage device 616 may be a device that is connected to a network, allowing multiple users connected to the same network to store data from the device. The network storage device may be communicably and operatively coupled to the network such that direct or indirect exchange of data, values, instructions, messages and the like may be permitted for multiple users.

Accordingly, implementations of the systems and methods discussed herein provide for digital document identification via a multi-stage or iterative machine-learning classification process utilizing a plurality of classifiers. Documents may be identified and classified at various iterations according to and identifying the digital document based upon agreement between a predetermined number of classifiers. In many implementations, these classifiers may not need to scan entire documents, reducing processor and memory utilization compared to classification systems not implementing the systems and methods discussed herein. Furthermore, in many implementations, the classifications provided by implementations of the systems and methods discussed herein may be more accurate than simple keyword-based analysis.

Although primarily discussed in terms of individual pages, in many implementations, documents may be multi-page documents. Pages of a multi-page document may be related by virtue of being part of the same document, but may have very different characteristics: for example, a first page may be a title or cover page with particular features such as document identifiers, addresses, codes, or other such features, while subsequent pages may be freeform text, images, or other data. Accordingly, the systems and methods discussed herein may be applied on a page by page basis, and/or on a document by document basis, to classify pages as being part of the same multi-page document, sometimes referred to as a "dictionary" of pages, and/or to classify documents as being of the same type, source, or grouping, sometimes referred to as a "domain". In some implementations, pages of different documents or domains that are similarly classified (e.g. cover or title pages of documents of the same type) may be collated together into a single target document; and conversely, in some implementations, pages coming from a single multi-page document may be collated into multiple target documents. For example, in some such implementations, a multi-page document that comprises cover pages from a plurality of separate documents may have each page classified as a cover page from a different document or domain, and the source multi-page document may be divided into a corresponding plurality of target documents. This may allow for automatic reorganization of pages from stacks of documents even if scanned or captured out of order, or if the pages have been otherwise shuffled.

In one aspect, the disclosure is directed to a method for machine learning-based data extraction executed by one or more computing devices: receiving, a candidate document for classification, iteratively (a) selecting a subset of classifiers from a plurality of classifiers, (b) extracting a corresponding set of feature characteristics from the candidate document, responsive to the selected subset of classifiers, (c) classifying the candidate document according to each of the selected subsets of classifiers, and (d) repeating steps (a)-(c) until a predetermined number of the selected subset of classifiers at each iteration agrees on a classification, comparing, a confidence score to a threshold, the confidence score based on the classification of the candidate document, the threshold according to each of the selected subsets of classifiers, classifying, the candidate document according to the agreed-upon classification, responsive to the confidence score exceeding the threshold; and modifying, by the computing device, the candidate document to include an identification of the agreed-upon classification.

In some implementations, a number of classifiers in the selected subset of classifiers in a first iteration is different from a number of classifiers in the selected subset of classifiers in a second iteration. In some implementations, each classifier in a selected subset utilizes different feature characteristics of the candidate document.

In some implementations, in a final iteration, first number of the selected subset of classifiers classify the candidate document with a first classification, and a second number of the selected subset of classifiers classify the candidate document with a second classification. In some implementations, the subset of classifiers of a first iteration are different from the subset of classifiers of a second iteration.

In some implementations, during at least one iteration, step (b) further comprises extracting feature characteristics of a parent document of the candidate document; and step (c) further comprises classifying the candidate document according to the extracted feature characteristics of the parent document of the candidate document.

In some implementations, step (d) further comprises repeating steps (a)-(c) responsive to a classifier of the selected subset of classifiers returning an unknown classification. In some implementations, during at least one iteration, step (d) further comprises repeating steps (a)-(c) responsive to all of the selected subset of classifiers not agreeing on a classification.

In some implementations, extracting the corresponding set of feature characteristics from the candidate document further comprises at least one of extracting text of the candidate document, identifying coordinates of text within the candidate document, or identifying vertical or horizontal edges of an image the candidate document. In some implementations, the plurality of classifiers comprises an elastic search model, a gradient boosting classifier, a neural network, a time series analysis, a regular expression parser, and one or more image comparators. In some implementations, the predetermined number of selected subset classifiers includes a majority of classifiers in at least one iteration. Further, the predetermined number of selected subset classifiers includes a minority of classifiers, the number of minority classifiers being at least greater than one classifier in at least one iteration.

In another aspect, this disclosure is directed to a system for machine learning-based classification executed by a computing device. The system includes a receiver configured to receive a candidate document for classification and processing circuitry configured to: select a subset of classifiers from a plurality of classifier, extract a set of feature characteristics from the candidate document, the extracted set of feature characteristics based on the selected subset of classifiers, classify the candidate document according to each of the selected subsets of classifiers, determine that a predetermined number of the selected subset of classifiers agrees on a classification, compare a confidence score to a threshold, the confidence score based on the classification of the candidate document, the threshold according to each of selected subsets of classifiers, classify the candidate document according to the agreed-upon classification, responsive to the confidence score exceeding the threshold; and modify the candidate document to include an identification of the agreed-upon classification.

In some implementations, each classifier in a selected subset utilizes different feature characteristics of the candidate document. In some implementations, the processing circuitry is further configured to: extract feature characteristics of a parent document of the candidate document; and classify the candidate document according to the extracted feature characteristics of the parent document of the candidate document.

In some implementations, extracting the corresponding set of feature characteristics from the candidate document further comprises at least one of extracting text of the candidate document, identifying coordinates of text within the candidate document, or identifying vertical or horizontal edges of an image the candidate document. In some implementations, the plurality of classifiers comprises an elastic search model, a gradient boosting classifier, a neural network, a time series analysis, a regular expression parser, and an image comparator.

In some implementations, the predetermined number of selected subset classifiers includes a majority of classifiers. In some implementations, the predetermined number of selected subset classifiers includes a minority of classifiers, the number of minority classifiers being at least greater than one classifier. In some implementations, the processing circuitry is further configured to return an unknown classification.

B. Machine Learning Based Data Extraction

As described herein, a document may include various different types of pages. Content in a document may be difficult and/or complicated to process because of the wide range of formats in which content may be provided, the lengths of the content, the phraseology of the content, and the level of detail of the content. Thus, the various types of content in digitally scanned pages, and the various types of pages of digitally scanned content, and various types of pages, forms, and pictures produced electronically or digitally by the document processing software, image producers, and so on, may make content extraction of digital documents extremely labor intensive and difficult to verify. For example, the information in a social security document is very different with respect to detail, length, organization, and content from the information in an invoice document.

While much of the discussion here focuses on single-page documents or pages, the systems and methods described herein may also be applied to documents, portions of documents, and portions of pages. In many implementations, the structure of a page in a document may be useful in identifying an accurate, efficient (in terms of computing resources and/or time) and reliable mechanism of data extraction from the page. For example, image based data extraction algorithms may perform better on some types of data than other algorithms/models.

Categories of page structures may include structured, semi-structured, or unstructured. Structured portions of pages may include specified fields to be filled with particular values or codes with fixed or limited lengths, such as tax forms or similar records. The data in a structured page may be characterized as being a non-line item (e.g., content may be arranged in a text box with a predetermined character length, content may be displayed using image(s) of a limited size on a page, data syntax). However, the structure of the page may be characterized as a line item (e.g., a table structure on a page). In contrast, unstructured portions of pages may fall into particular categories, but have few or no specified data fields, and may comprise text or other data of any length, such as legal or mortgage documents, deeds, complaints, etc. Accordingly, the open-ended data in unstructured pages may be characterized as a line item. However, the structure of the page may be characterized as a non-line item (e.g., paragraphs including lines of content). Further, some portions of unstructured pages may also have data arranged in non-line items. For example, a handwritten letter may be an unstructured page. The handwritten letter may include some data characterized according to line items (e.g., quantity) and some data characterized according to non-line items (e.g., content of the letter, date).

Semi-structured pages may include a mix of structured and unstructured portions. For example, some portions of the page may have length limitations and other portions of the page may have no limitations.

Accordingly, pages may be labeled according to the page type (e.g., title page of document 1, signature page of document 3) and according to the sub-categories of each page (e.g., structured, unstructured, and semi-structured). Techniques that may be used to extract data associated with non-line items may not work (or be as efficient/accurate) in extracting data associated with line items.

In addition to data having a line item or non-line item characterization, content in the line items/non-line items may be described in different ways. For example, different date non-line items may indicate the date in year-month-day format, while other date non-line items indicate the date using day-month-year format. In some cases, the year may only include the last two digits of the year, while in other cases, the year may include four digits (e.g., 2020 vs 20). In some other cases, the date may be in any of the ISO date formats, and the components of the date may be with different separators. The separator may be "/", "-", ".", or space, or some other tokens that are commonly used with dates. In few other cases, it may follow non-ISO standards (e.g., 1 Apr. 2020). In some cases, the date might have the time and/or time-zone as well.

Because of the diversity of data in pages, and the data characterizations in each pages, the data being extracted from pages, may be diverse. Accordingly, a confidence score may be associated with the extracted data. The confidence score indicates that labeled portions of the pages (e.g., data characterizations of the document such as line items/non-line items) are extracted correctly. That is, the confidence score indicates the accuracy of using a particular model or plurality of models to extract data. The confidence score quantifies how well a model or plurality of models is performing on the types of data in the document. For example, the Levenshtein distance algorithm, as discussed herein, may advantageously be employed when assessing the similarity of keywords in various pages. However, the Levenshtein distance algorithm may not perform well when employed in long documents and/or when assessing one word. Because models are designed for a particular purpose, models have both strengths and weaknesses. Accordingly, the confidence score indicates whether the particular model is suited for the particular purpose (e.g., whether the model extracted the data accurately). The confidence score may also evaluate the correctness of the extracted data.

To address these and other problems of identifying and extracting content from digital documents and pages, implementations of the systems and methods discussed herein provide for digital data (e.g., digital document content) extraction via a multi-stage or iterative machine-learning extraction process utilizing a plurality of models/algorithms. In many implementations, these models/algorithms are orchestrated in an architecture that balances association matching and exact matching to extract content from labeled data. A second machine learning model may implement a series of validations and comparisons to extract accurate data from digital documents.

For example, a document (or portion of a document/page) may be labeled as containing data characterized as non-line items. The document (or the portions of the document) associated with non-line items may be analyzed using models/algorithms that match strings of data. That is, if the document contains non-line items, exact matching models may be beneficially implemented because of the limited (or predictable, known) data syntax associated with non-line items. If models/algorithms searching the document/page for exact string matches are successful, the confidence value associated with the extracted data may be boosted. That is, there is a higher confidence that the models/algorithms worked well (because there was an exact match to strings in the document/page) and the extracted content is likely accurate.

If models/algorithms searching the document/page for string matches in data fields associated with non-line items are unsuccessful, other association matching (or comparison, or fuzzy) models and/or algorithms may be applied to the document/page. That is, instead of applying models/algorithms that search for exact matches of strings in a document/page, models/algorithms may be applied to a document/page that look for associations between strings. If the fuzzy matching algorithms successfully correlate strings in the document/page (e.g., a similarity score between two strings satisfy a threshold) then the confidence associated with the extracted data may be boosted. The data extracted from the document and displayed to a user (or selected or stored) will be the data that received the highest confidence scores after performing each of the various matching (or comparison) models.

In contrast to the above example, when the document (or portions of the document/page) is labeled as containing data characterized as a line item, then the document (or the portions of the document/page) associated with line item may be analyzed using models and/or algorithms that associate strings of data. That is, if the data on the page is labeled as being a line item, comparison algorithms may be implemented because of the variability of the data in the page. The models and/or algorithms employed to perform the comparisons may correlate strings based on associations between strings, not exact matching of strings. If the fields (e.g., extracted key values from individual models employed on the page or portions of page) do not satisfy one or more association thresholds, then the field (or portions of field) may be discarded. If the fields (or portions of fields) are associated with strings (e.g., the string similarity exceeds a threshold), then the data in the field may be extracted.

In some implementations, in addition to determining whether line items satisfy a similarity threshold (or correlation threshold) a confidence score associated with that extracted data may be boosted if a confidence threshold is satisfied. After comparing the fields (or portions of fields) using association matching models and/or algorithms, then, in some implementations, the fields (or portions of fields) may be compared to strings using exact matching searching algorithms and/or models. Upon determining exact matches between strings, the confidence associated with the exact matching models (and portion of the extracted field and/or extracted field) may be further boosted. The data extracted from the document (or page) and displayed to a user will be the data that received the highest confidence scores after performing each of the various matching models.

Although primarily discussed in terms of individual pages/documents (e.g., a single page document), in many implementations, documents may be multi-page documents. Pages of a multi-page document may be related by virtue of being part of the same document, but may have very different characteristics: for example, a first page may be a title or cover page with particular features such as document identifiers, addresses, codes, or other such features, while subsequent pages may be freeform text, images, or other data. The systems and methods discussed herein may be applied on a page by page basis, on a document by document basis, and/or on portions of pages to extract content from pages as being part of the same multi-page document and/or to extract content from documents as being of the same type, source, or grouping (sometimes referred to as a "domain").

Figure 7A:
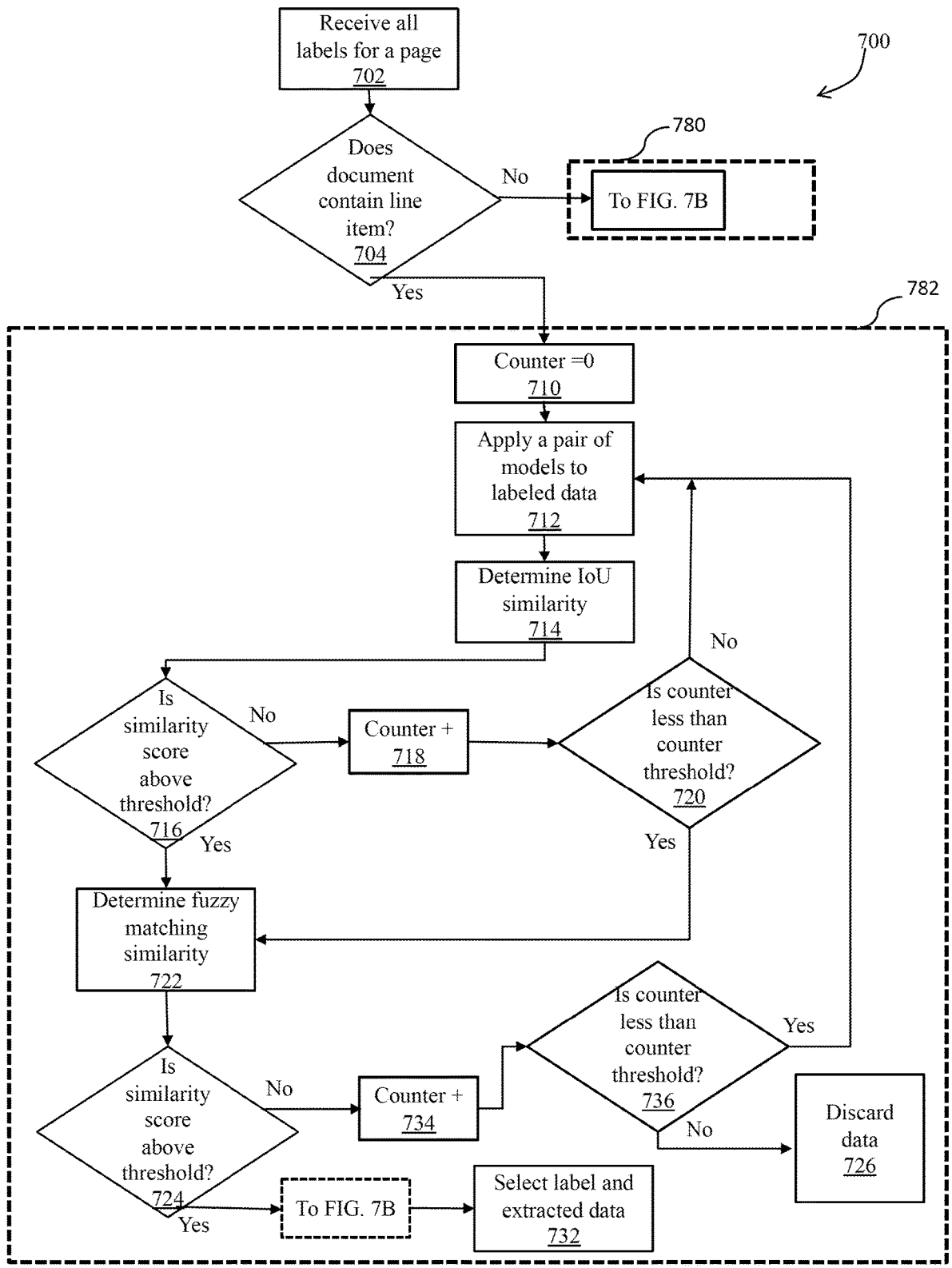
FIGS. 7A-7C are flow charts of a method for machine learning based text extraction, according to some implementations.
Figure 7B:
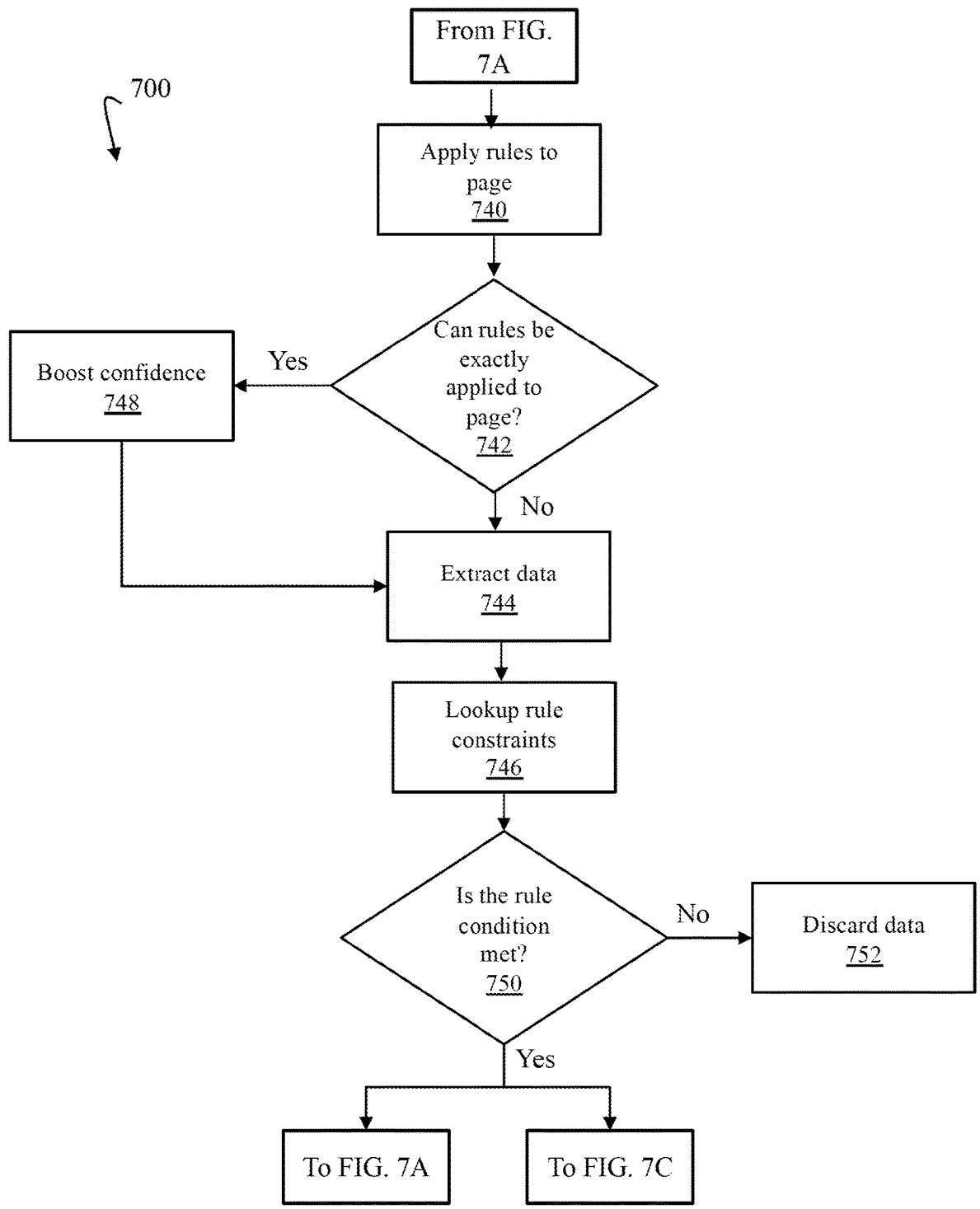
Figure 7C:
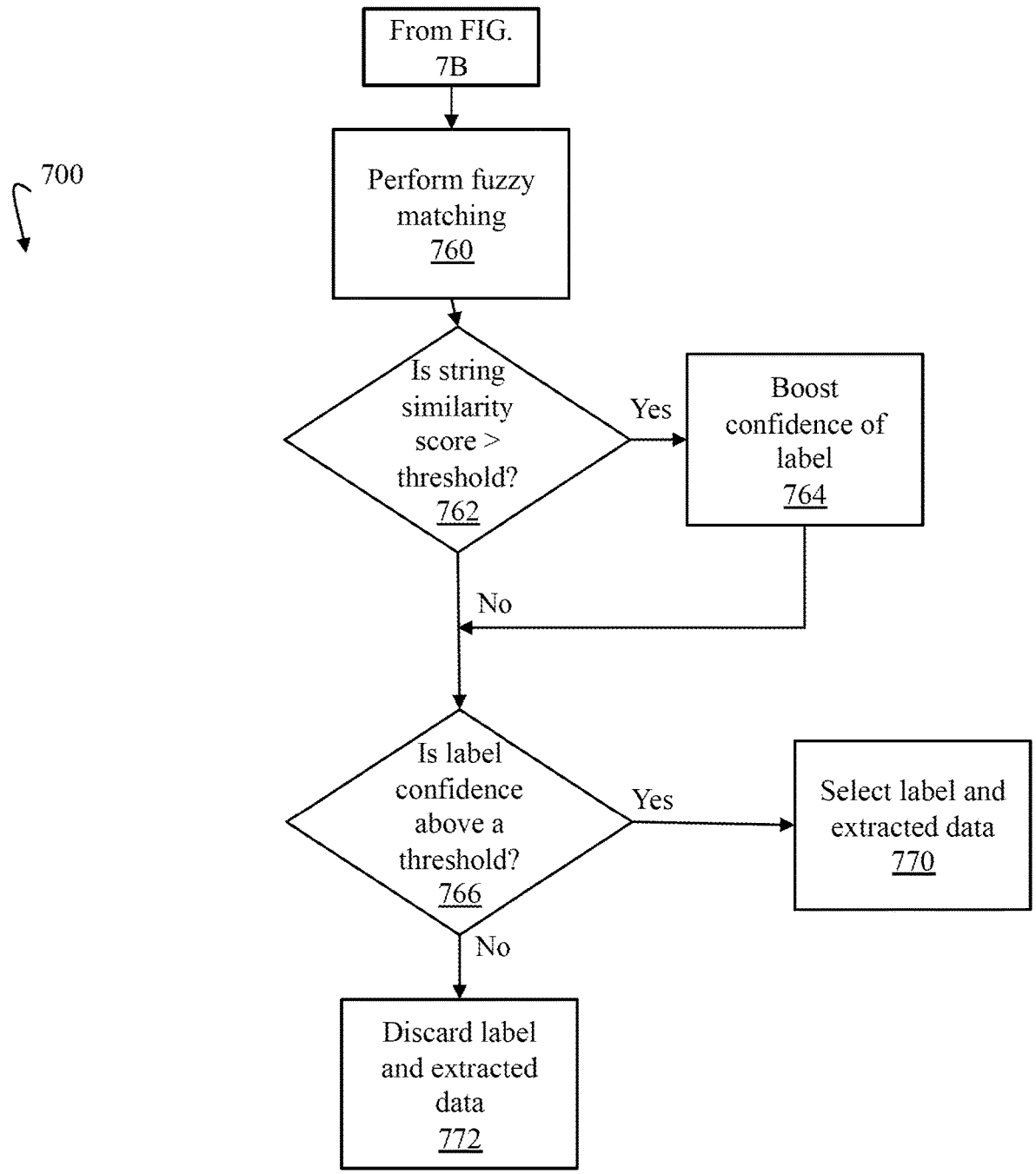

Referring to FIGS. 7A-7C, depicted is a flowchart of an embodiment of a method 700 for machine learning-based data extraction. The functionalities of the method may be implemented using, or performed by, the components detailed herein in connection with FIGS. 1-8. In brief overview, labels associated with documents and pages may be identified and/or received. If the document and/or page (or portion of document and/or page) includes line item labels, then the mashup 782 will be performed. If the document and/or page (or portion of the document and/or page) includes non-line item labels, then mashup 780 will be performed.

Still referring to FIG. 7A, in step 702, labels for a page may be received. After the page has been labeled (e.g., step 150 in FIG. 1B of a first machine learning model), the page and associated labels may be ingested by the second machine learning model. As discussed herein, labels may be used to identify the pages in a single document and may include, but are not limited to: title page, signature page, first pages, middle pages, end pages, recorded pages, etc. In an example, document 1 may be labeled a W2 document, document 2 may be labeled a Social Security document, and document 3 may be an invoice. Further, labels may be used to identify documents from one another and may include, but are not limited to: document 1, document 2, document 3, page 1, page 2, page 3, etc., where a user could use the document labels to map the digitally scanned, captured, or produced document to a physical document. In other embodiments, the document may be labeled according to specific labels, for example: title of document 1, title of document 2, etc., where the "title" portion of the label would correspond with the title of a physical document.

Additionally, the page (e.g., a single page document) may be labeled according to the data structure of the page. For example, pages may include line items or non-line items. Labels may indicate whether portions of the data in the page are arranged in (directed to, or organized in) line items or non-line items.

In some configurations, if the page is labeled based on the identity of the page (e.g., title page, signature page, first page, etc.), the label of the content on the document (e.g., whether a portion of the document includes line items or non-line items may be determined. Additionally or alternatively, if the document is labeled to distinguish documents (or pages of documents), the label of the content of the document (e.g., whether a portion of the document includes line items or non-line items) may be determined.

In another implementation, if some or all labels are not received at step 702, labels may be identified (or determined) at step 702. For example, object detection algorithms/models may be applied to portions of a document and/or page. As discussed herein, edge detection algorithms may be applied to identify structural features or shapes of a page and compare the structural feature or shapes from templates of embossing or stamps. In other configurations, You Only Look Once (YOLO) models may be used to detect objects in a page/document. For example, boundary boxes may be drawn around symbols, strings, characters and/or shapes on a page and used to classify symbols, strings, characters and/or shapes on the page. In other configurations, optical character recognition may be performed to label documents. For instance, optical character recognition may be used to recognize strings (words, symbols, characters) in a digital document. Strings/Symbols/Characters in the digital document may be compared to strings/Symbols/Characters in a word database. Thus, optical character recognition models search for strings in the document and/or page matching certain characteristics of symbols in a database. Portions of the document and/or page may be classified as line items or non-line items based on string matches. For example, optical character recognition may match strings on a page to strings in a database such as "boundary line", "property", "deed", among others. In this case, it may be determined that the page is a page of a deed and the page may be labeled accordingly.

Additionally or alternatively, natural language processing methods may be implemented to label the document and/or page by analyzing patters of human language and predicting words. Natural language processing methods may include implementing neural networks to create a language model. Language models may operate by ingesting text and predicting the probability of a next word of the text. An example of a pre-trained neural network designed to recognize human language and predict language includes Bidirectional Encoder Representations from Transformers (BERT). BERT is trained using an encoder (which reads the text as an input) and a decoder (which predicts text), utilizing bidirectional training to better understand the context (e.g., neighbors) of words. In other configurations, part of speech (PoS) tagging can be employed to classify sub-categories by identifying the context and definition of the symbols/strings/words on the document/page. One or more various algorithms/models may be employed to label the page. For example, multiple image recognition algorithms and/or models may be employed. For instance, as discussed herein, a term frequency-inverse document frequency vector may be utilized to label pages using identified or extracted textual data from optical character recognition. Additionally, multiple natural language processing algorithms and/or models may be employed, or some combination or object detection algorithms and/or models and natural language processing algorithms and/or models may be employed.

A computing device employing a second machine learning model (where the first machine learning model is the machine learning model described in FIGS. 1A-1B) may separate logic for handling line items from logic for handling non-line items in decision 704. The second machine learning model is an architecture that balances association matching and exact matching based on the labeled structure of the document to extract accurate content.

The decision 704 depends on a computing device determining whether a label indicates (or classifies a page/document) as including line items or non-line items. The data characterization of the content (e.g., the label identifying line item or non-line item portions of a document/page) instructs the second machine learning model of the method (s) in which to extract content. For example, if the page (or portion of the page) is labeled indicating a line item, the computing device determines to process the content according to mashup 782. If the page (or portion of the page) is labeled indicating a non-line item, the computing device determines to process the content according to mashup 780.

Mashup 780 and mashup 782 process labels differently based on whether the labels are line items or non-line items. Mashup 780, configured to analyze non-line item labels, may apply more exact matching models. The predictability of non-line items allows for more stringent search patterns (or sequences or strings). Accordingly, string searches may be based on a database of rules (or predetermined search sequences). In contrast, mashup 782 is configured to analyze line items. Accordingly, mashup 782 includes more thresholds (instead of exact matching sequences) than mashup 780. Accordingly, mashup 782 includes more verification and comparison steps than mashup 780.

Because mashup 780 is applied to pages (or portions of pages) identified as including non-line items, and because non-line items may be identified using rules, step 740 of mashup 780 in FIG. 7B applies rules to the page. Rules may represent patterns (sequences, or strings) that may appear in documents/pages containing non-line items.

In some configurations, users may revise the rules (remotely and/or locally) using a user interface (e.g., generating inputs via a user interface layer 622 in FIG. 6) or application programming interface (e.g., passing request programmatically using APIs/SDKs). In some configurations, the computing device hosting the second machine learning model may query a database (e.g., using a database layer 626 in FIG. 6) for rules to be applied to non-line item labels. For example, an external rules script may be imported in real-time each time the second machine learning model is employed to extract data from documents labeled with non-line item labels.

Additionally or alternatively, the database may be queried for rules scripts periodically (e.g., every six months, every day, every hour, multiple times per minute, and the like). In some configurations, the rule scripts may be updated in real time (or near real time). Additionally or alternatively, the database may not be queried because rules may be stored in the computing device hosting the second machine learning model.

In some configurations, the rules may be format rules. For example, as described herein, there may be one or more date rules. Date rules may include rules that map various date forms to a date. For example, content (e.g., a date) may be extracted from a date having the form "MM-DD-YYYY" (two digit month input, two digit day input, and four digit year input). Other combinations of date rules may exist ("MM-DD-YY", "M-D-YY", "M-D-YYY", etc.) such that date content may be extracted using a date rule. In some cases, the date may be in any of the ISO date formats, and the components of the date may be with different separators. The separator may be "/", "-", ".", or space, or some other tokens that are commonly used with dates. In few other cases, it may follow non-ISO standards (e.g., 1 Apr. 2020). In other cases, the date might have the time and/or time-zone as well.

In some configurations, the rules may be content rules. For example, a rule may map certain strings to certain content. For example, a rule may involve searching for strings such as "Invoice Number" and mapping subsequent characters (until a space/end token is identified) as the content that is associated with the rule "Invoice Number."

Applying rules to the labeled data in the document/page may include employing comparison algorithms (or matching models, or the like) to search for data associated with the rule (and comparing the rule to the data). For example, using exact matching models, strings in labeled portions of the document/page may be compared with strings defined by rules. In some configurations, RegEx classifiers may be applied and/or Named Entity Recognition (NER) with n-gram searches may be applied to perform the exact matching.

The decision in step 742 evaluates whether the rules are exactly applied to the document/page (e.g., the patterns dictated by the set of rules are matched in the labeled data). Rules are exactly applied to the document/page if the strings (determined by the rules) are exactly matched to strings in the document/page. Because non-line items are inherently more predictable than line items, strings defined by rules may be exactly matched to strings in the labeled portions of the document/page.

In step 748, if strings associated with the rule are exactly matched with strings associated with the labeled data, then a confidence score associated with that match will be boosted or increased. That is, because a string of characters exactly matches an expected string of characters (e.g., a rule applied to a page in step 740), then the data associated with the rule is likely an accurate extraction of the data in the labeled data. After the confidence of the label is boosted, the process proceeds to step 744.

In step 744, data is extracted. For example, a field with a data entry "$42.6" may extract an output value of "$42.6." In some configurations, rules may be used to extract data. For instance, a rule may be applied to a page (e.g., step 740) to search for strings on the page of the form "Loan Number ***." If the string "Loan Number 12345" is identified on the page, then the confidence of the extracted data is increased (e.g., the rules was determined to have been exactly applied to the page in decision 742 and the confidence was boosted in step 748). The string Loan Number 12345 will be extracted in step 744**.

In a second example, a rule may be applied to a page (e.g., step 740) to search for strings on the page of the form, "Invoice Number ***". If the string is not identified on the page (e.g., the rule was not determined to have been exactly applied to the page in decision 742), then raw data may be extracted in step 744. For example, the string "Invoice Number ***" may not be identified because the string "Invoce Number 12345" (with a typographical error) is on the page. Accordingly, the string "Invoce Number 12345" will be extracted.

In step 746, rule constraints may be retrieved (or looked up) from a database (e.g., using a database layer 626 in FIG. 6). Rule constraints may impose additional limitations to rules. For example, a rule indicating the loan number format (e.g., a rule) may be associated with a threshold loan number (e.g., a rule constraint). The rule and rule constraints may be mapped using a lookup table, for instance. In some configurations, there may be one or more rule constraints associated with a rule. In other configurations, there may be no rule constraints associated with a rule.

In decision 750, the extracted data is compared to the rule constraints. In an example, a rule may indicate that loan numbers are of the form: "#####". In addition, a rule constraint may indicate that the loan number should not exceed 50000. In a particular example, a loan number of 99999 may be extracted from the document because it has a five digit format (e.g., exactly matches the format of the loan number rule). However, when the extracted loan number (e.g., 99999) is compared with the rule constraints (e.g., satisfying a threshold of less than 50000), then it may be determined that the loan number does not satisfy the rule constraints. The decision in step 750 evaluates whether the rule condition is satisfied.

Accordingly, the data extracted in step 744 may be considered conditionally extracted because the extracted data may also satisfy any rule constraints (if there are any rule constraints) before being extracted and presented for display to a user (or selected or stored). For instance, if the rule conditions are mapped to rules using a lookup table, and the rule conditions are not satisfied, then the extracted data (e.g., conditionally extracted data) may be discarded in step 752. Discarded data is data that may not be selected, stored, and/or displayed to a user. In the above example, because the loan number 99999 is not less than 50000, then the rule condition is not satisfied and the data is invalid. Accordingly, the data may be discarded in step 752. As discussed herein, in the event there are no rule conditions (or rules) associated with the labeled data, the extracted data may not be discarded.

If the data is not discarded (e.g., the rule condition decision in step 750 is satisfied, or there is no rule condition), then the process proceeds from FIG. 7B to 7C. In step 760 of FIG. 7C, fuzzy matching may be performed to determine a string similarity score. Fuzzy matching, or other text analytics models, may be applied to evaluate the relatedness of strings and generate a string similarity score. For example, the relatedness of strings in the labeled data to strings associated with rules may be determined.

One example of a fuzzy model is the Levenshtein distance algorithm. Fuzzy string matching algorithms search for strings that reasonably match a given pattern. The Levenshtein distance algorithm assesses the text similarity of two strings by determining the minimum number of edits (insertions, deletions, or substitutions) to match the strings. In an example of the Levenshtein distance algorithm, strings in the labeled data may be compared to strings associated with rules. A string similarity score between 0 and 1 may be determined such that a score of 1 is produced if the compared strings are identical, and a score of 0 is produced if there are no common characters between strings.

Latent Dirichlet Allocation (LDA) is a different topic-modeling algorithm (similar to topic-modeling algorithm LSA described herein), that may be employed to determine the similarity of labeled data to a set of rules. Topics in a labeled data may be modeled according to a Dirichlet distribution of topics, and each topic may be described by a Dirichlet distribution of words. Jean Shannon Distance may be used to measure the similarity of the document distributions to generate a string similarity score between the labeled data and a set of rules.

Although typically used for language embeddings, neural networks may be employed to evaluate the similarity of strings and generated a string similarity score such that the relatedness of the strings (e.g., fuzzy matching) is determined. For example, a Word2Vec neural network and cosine similarity may be employed to determine the similarity of labeled data (or portions of documents/pages) to a set of rules. Word2Vec neural networks may take one or more string inputs and return vectors that group strings together based on similarity. In a simple example, a neural network may group "cat" with "kitten" and group "dog" with "puppy." Accordingly, the neural network may compare strings in the set of rules to strings in the labeled data. The neural network may predict the similarity of strings based on past appearances of the string. The neural network may also learn relationships between the strings by any appropriate supervised or unsupervised learning methods. Word2Vec operates by assigning a numerical representation to each string and comparing context similarity between the strings in a document using the numerical representations of the strings.

Cosine similarity may be applied to the vector outputs of the Word2Vec neural networks to calculate an angle between the string vectors. A ninety-degree angle may indicate that there is no similarity between the vectors, while total similarity may be expressed by a zero degree angle because the strings would completely overlap (e.g., exact matching). The angle between the vectors may be converted into a string similarity score. Doc2Vec, an extension of Word2Vec, may be used to determine the similarity between sentences and/or documents, as opposed to the word similarity analysis in Word2Vec.

Word Mover's Distance (WMD) may be an additional approach employed in the fuzzy matching step 760 to determine the similarity of labeled data (or labeled portion of a documents), such as the line items in documents, to a set of rules. WMD creates a weighted cloud of words from two sources and measures the distances between words in the weighted cloud. For example, the number of transformations from one string to achieve a second string may be determined. The similarity of the documents may be quantified by the distances between the labeled data and the set of rules, where the distances between the labeled data and the set of rules is represented by the transformations necessary to transform the strings in one document to similar strings in the second document. The string similarity score may be inversely proportional to the distance between the labeled data and the set of rules (and/or the number of transformations necessary to transform the strings in one document to similar strings in the second document).

Additionally or alternatively, as discussed herein, image detection algorithms and/or models may be performed. For example, edge detection algorithms may be applied to identify structural features or shapes of a page and compare the structural feature or shapes from templates of embossing or stamps. Other image processing models that may be employed include similarity indexing models (e.g., Salton index, Jaccard index, Sorenson index, Hub Promoted index, Hub depressed index) and OpenCV. In other configurations, You Only Look Once (YOLO) models (including, for instance both YOLOv3-Full and YOLOv3-Lite) may be used to detect objects in a page/document. For example, boundary boxes may be drawn around symbols, strings, characters and/or shapes on a page and used to classify symbols, strings, characters and/or shapes on the page. Other object detection algorithms may include CenterNet ResNet, CenterNet MobileNet, Single-Shot multibox Detection (SSD) ResNet, SSD MobileNet, SSD Resnet with Feature Pyramid Network, SSD MobileNet with Feature Pyramid Network, EfficientDet, Faster Region based Convolutional Neural Networks (R-CNN), The fuzzy matching approaches performed at step 760 may be used to measure various levels of string similarity. For example, maximum string similarity scores may be determined by evaluating the similarity of entire strings. Additionally or alternatively, partial string similarity scores may be determined by evaluating the similarity of portions of strings. For example, a portion of a string may be compared to one or more portions of other strings.

In addition to performing fuzzy matching in step 760, the construction of the strings may be modified to determine string similarity scores. For example, one string construction may include considering a sentence to be a string. The token sort approach involves creating tokens associated with several characters in the string, alphabetizing the tokens, and subsequently analyzing the original string with respect to the alphabetized token string. For instance, the string "peanuts and crackerjacks" may appear dissimilar to the string "crackerjacks and peanuts." However, while the strings are not exactly matched, the strings are the same, but merely in dissimilar constructions. Considering other constructions of the string may highlight the similarity of the strings. For example, using the token sort approach, both strings would result in "and cracker jacks peanuts." Thus, the strings would exactly match and yield a high string similarity score.

The decision in step 762 may evaluate the similarity of the strings. The strings may be considered similar if the string similarity score exceeds a threshold. In some configurations, a user may define a threshold. In other configurations, the threshold may be tuned as a hyper parameter. In the event the string similarity score satisfies the threshold, the process may proceed to step 764 before proceeding to decision 766. In the event the string similarity does not satisfy the threshold, the process may proceed directly to decision 766.

In step 764, the confidence of the labeled data associated with the data on the page is boosted or increased. That is, because a string of characters is similar enough to satisfy a threshold, then the data associated with the label document is likely an accurate extraction of the labeled data. Confidence scores may be boosted when similarity scores exceed a threshold (or strings of data being compared exactly match).

The decision in step 766 may evaluate the confidence score associated with the labeled data. Each time there was an exact match or the string similarity exceeded a threshold, the confidence score associated with the accuracy of that string was increased (e.g., FIG. 7B step 748 and FIG. 7C step 764). The confidence score indicates, for example, how confident the second machine learning model is in displaying that the Loan Number on a document is 12345, where the extracted data (e.g., 12345) is determined from one or more algorithms and/or models. In the event the confidence score exceeds a threshold, the process may proceed to step 770. In the event the confidence score does not exceed a threshold, the process may proceed to step 772. In some configurations, a user may predetermine a confidence score threshold. In other configurations, the confidence score threshold may be tuned as a hyper parameter of the second machine learning model.

In the event the confidence score exceeds the threshold, then the data and associated label may be selected, stored, and/or displayed to one or more users in step 770. That is, the extracted data is accurate enough to be displayed to a user.

In the event the confidence score does not exceed a threshold, the data associated with the label may be discarded in step 772. That is, the extracted data may not be accurate enough to be selected, stored and/or displayed to a user.

Referring to FIG. 7A, mashup 780 may be iterated until all of the labels and associated rules identified with a document/page are analyzed. For example, one rule may have different variations. For instance, as described herein, a date rule format may include "MM-DD-YYYY", "MM-DD-YY", "M-D-YY", "M-D-YYY", etc. Mashup 780 may be repeated (or iterated) until each variation of every rule is compared using one or more searching models. For example, in a first iteration, the date format "MM-DD-YYYY" may be compared to strings in the document. In a second iteration, the date format "MM-DD-YY" may be compared to strings in the document, etc. Each iteration, one or more rules may be applied to the document. For example, one variation of a date format rule may be applied to the document, one variation of a signature rule may be applied to the document, and the like.

Still referring to FIG. 7A, if decision 704 determined that the label from step 702 indicates (or classifies a page/document) as including line items, then mashup 782 may be executed. As shown in step 710 of mashup 782, a counter may be initialized The counter may be used to iterate through multiple models (e.g., comparison algorithms, or matching algorithms). As opposed to data being identified/extracted using rules (such as non-line items in mashup 780), line items in mashup 782 may be more likely identified/extracted using combinations of algorithms/models. However the combinations of algorithms/models may need to be limited (by employing counters) such that mashup 782 does not iterate indefinitely. Each iteration, the models extract data differently from the document.

In step 712, a plurality of models (e.g., comparison algorithms, extraction models, or searching models) may be applied to the labeled data (e.g., data characterized as being a line item).

Extraction models may include, for example, optical character recognition. For example, strings of recognized characters may be extracted. For instance, natural language processing models such as Conditional Random Fields (CRFs), spaCy, transformer, and Long Short Term Memory (LSTM) networks (e.g., bidirectional or unidirectional) may be employed to extract data. For instance, the bidirectional LSTM may be effective in sequencing natural language processing by being trained to extract characters and/or strings in data by predicting sequences of characters and/or strings. For example, the network may be trained to predict the next m characters given an input of n characters using supervised learning (as discussed in FIG. 5).

Although typically used for processing and embeddings, models/algorithms may also include, but are not limited to LSA models, RegEx classifiers, n-grams, word2Vec, Doc2vec, LDA, and WMD. An n-gram is a sequence of n-items (e.g., characters, strings, etc.) in data.

In an example, both an n-gram and a RegEx classifier may compare strings in the document to stored expressions (e.g., RegEx patterns and/or n-gram sequences). Additionally or alternatively, the pairs of models may compare one or more portions of the labeled data to other portions of the labeled data. (e.g., comparing a string in the labeled data to other strings in the labeled data). Each model may output an array indicating whether particular patterns were found in the labeled data. For example, in some implementations, in response to strings in the document being matched to a string sequence (e.g., a RegEx), a k-length array of k Regexes may be determined, where the i-th element in the array is the number of times the i-th RegEx matched the strings in the document. In the above example, both RegEx classifiers and n-gram sequences may independently determine that the string "deed", for example, was identified in the document.

In step 714, the outputs of the pair of models are evaluated using a similarity measure index to indicate whether the models produced equivalent (or correlated, or similar) results. In some cases, the models applied to the label data in step 712 may not be efficient at searching for strings in the labeled data. As discussed herein, models are designed for particular purposes. In some cases, models may be applied to labeled data that does not align well with the purpose of the model. For example, a Levenshtein algorithm may be applied to a title page. The result of the Levenshtein algorithm may not be accurate because Levenshtein may do not perform well when assessing the similarity of singular words. In contrast, an n-gram sequence may perform well in extracting a singular word. Accordingly, the similarity measure between the two models would be low. If both models identified similar data, then the models applied to the data in step 712 were correctly applied models. If the models did not identify similar data, then either both models, or one model applied to the data in step 712 may not have been correctly applied.

For example, an intersection over union algorithm may be applied (e.g., Jaccard index or IoU) to evaluate the similarity of the respective outputs produced by each model in the pair of models. The Jaccard index may be determined by finding the intersection of the two arrays and dividing the intersection by the union of the two arrays. Other measures of similarity (e.g., other similarity measure indices) may evaluate the similarity of the outputs produced by each model. For example, the Sorensen coefficient may be calculated by evaluating the similarity among species between the outputs produced by each model.

The decision in step 716 may evaluate the similarity score determined by the similarity measure (e.g., Jaccard index, Sorenson coefficient, etc.). The decision in step 716 evaluates the similarity of strings to determine whether the models (e.g., the models applied to data in step 712) are appropriately searching and comparing data in the labeled data. For example, some models may perform well on long documents, other models may perform well on short documents. The result of the similarity score evaluation indicates whether the models were the right types of models to apply to the line item data.

In the event that one model (or both models) are not designed for searching (or comparing) patterns in the labeled data, the similarity score may not be high and the similarity score may not satisfy the threshold. Additionally or alternatively, one model (or both models) may be designed for searching for strings in the labeled data, and the similarity score may satisfy the threshold.

If the similarity score does not satisfy the threshold, the process may proceed to step 718 to increment a counter. The counter may be incremented to track the number of iterations, limiting the total iterations (and time spent) applying models to the labeled data.

The decision in step 720 evaluates whether the counter exceeds a counter threshold. The counter threshold may prohibit the second machine learning system from iterating mashup 782 endlessly. The counter threshold may be determined by a user, determined dynamically as a hyper parameter, or based on a total number of models (or some fraction or multiple of the total number of models). If the counter does not exceed a threshold, then the process may proceed to step 712 to reapply new pairs of models to the labeled data. As discussed herein, it may be the case that the pairs of models applied previously in step 712 were simply poor at searching for (and comparing) strings in the labeled. Accordingly, the second machine learning model benefits from reapplying model pairs to the labeled data in step 712.

The iterations in mashup 782 may be geometric. Each iteration in mashup 782, or each time the second machine learning model determines that the counter does not satisfy a threshold (e.g., in steps 720 or 736), may begin at step 712. When step 712 is executed, the models applied in step 712 may change. That is, different models may search for patterns in the labeled data each iteration. In some configurations, the models applied to the label data in step 712 each iteration may be different.

Additionally or alternatively, the models applied to the label data in step 712 each iteration may be chains of models. The two models applied to the line item data in the previous iteration may be combined (or chained, or sequenced). For example, a model A may compare strings in two datasets and a model B may compare strings in two datasets. In a next iteration, model C (e.g., combination of models A and B) may compare strings in two database and model D may compare strings in two datasets. In some configurations, the search sequences applied to models A and B are also combined.

Additionally or alternatively, mashup 782 may iterate through the various models changing the search strings each iteration. For example, a model pair may compare string A and B. In a next iteration, a model pair may compare string C (a combination of strings A and B), and D. That is, each of the patterns being searched for may update each iteration.

If the counter exceeds the threshold in decision 720, then the process will proceed to step 722 such that the models are not endlessly applied to the labeled data in step 712. Similarly, if the similarity score in decision 716 satisfies a threshold, the process may proceed to step 722.

In step 722, fuzzy matching may be performed using a fuzzy model and/or algorithm. As discussed herein, an example of a fuzzy model is the Levenshtein distance algorithm. Fuzzy models, or other text analytics models, may be applied to evaluate the relatedness of strings. For example, the fuzzy matching models may search the output arrays (e.g., from the models applied to the data in step 712) for patterns (or sequences or strings). In some configurations, each of the arrays may be aggregated into an intermediary document such that the fuzzy matching algorithm models a single document for predetermined patterns. In some configurations, each of the arrays may not be aggregated into an intermediary document and the fuzzy matching model/algorithm may search each array for predetermined patterns.

Additionally or alternatively, as discussed herein, image recognition models and/or trained neural networks may be executed to evaluate the similarity of the data extracted from the models applied in step 712. For example, edge detection algorithms may be applied to identify structural features or shapes of a page and compare the structural feature or shapes from templates of embossing or stamps. In other configurations, You Only Look Once (YOLO) models may be used to detect objects in a page/document. For example, boundary boxes may be drawn around symbols, strings, characters and/or shapes on a page and used to classify symbols, strings, characters and/or shapes on the page. In other configurations, optical character recognition may be performed to label documents.

The decision in step 724 evaluates whether the line item data is being accurately extracted. The decision in step 724 evaluates the similarity of the strings determined from the output arrays and the predetermined search sequences of the fuzzy matching models/algorithms. The strings may be considered similar in the event that a string similarity exceeds a threshold. In some configurations, a user may define a threshold. In other configurations, the threshold may be tuned as a hyper parameter.

In the event the string similarity satisfies the threshold, the process may optionally proceed through steps 740 to step 750/752 in FIG. 7B to identify whether predetermined search sequences and/or rule constraints exist.

The decision in step 704 of FIG. 7A depends on correctly identifying whether the labeled portions of the document include line item structures or non-line item structures. In some configurations, because mashup 782 is broader (e.g., the algorithms/models in mashup 782 are more flexible because they do not depend on exactly matching strings to predetermined string rules/sequences/patterns, or association matching is performed as opposed to exact matching), the user using may optionally determine to execute steps 740 to step 750/752 of FIG. 7B during mashup 782. Executing optional steps 740 to step 750/752 of FIG. 7B during mashup 782 may improve the accuracy of the second machine learning model. However, performing optional steps 740 to step 750/752 of FIG. 7B during mashup 782 may also consume extra computational resources and/or consume extra time before selecting, storing and/or displaying extracted data to a user.

The second machine learning system may be configured to proceed through steps 740 to step 750/752 if, for example, a user using a user interface (e.g., generating inputs via a user interface layer 622 in FIG. 6) determines that it is beneficial to search the labeled data for non-line items and/or to identify other predetermined search sequences and/or rule constraints in the line items.

Referring to FIG. 7B, upon completion of step 750, in the event the rule condition has not been satisfied, the process may proceed to step 752 and the data may be discarded (e.g., not displayed to a user, selected or stored). Alternatively, upon the completion of step 750, in the event the rule condition has been satisfied, the process may proceed back to FIG. 7A.

Referring back to FIG. 7A, the process may proceed to step 732. If the similarity score satisfies a threshold (e.g., decision in step 724 in FIG. 7A) or the conditionally extracted data has satisfied a rule condition (e.g., step 750 in FIG. 7B), then the data associated with the label may be selected, stored, and/or displayed to one or more users in step 732. That is, the extracted data is accurate enough to be displayed to a user.

In the event the similarity score does not satisfy a threshold in decision 724, the process may proceed to step 734 to increment a counter. The counter may be incremented to limit the number of iterations. In some configurations, the counter in step 734 may be separate from the counter in step 718. In the event that the counter in step 734 is different from counter in step 718, then in step 710, two counters may be initialized (e.g., one counter for the counter in step 718 and one counter for the step in 734). In other configurations, counter in step 734 may be the same as counter in step 718. Using the same counter in step 734 and in step 718 may in operation, reduce the time that the second machine learning model spends determining extracted data.

The decision in step 736 evaluates whether the counter exceeds a counter threshold. In some configurations, the counter threshold may be the same counter threshold as employed in decision 720. In some configurations, the counter threshold in decision 736 may be different from the counter threshold in decision 720. The counter threshold in decision 736 may be determined by a user or determined dynamically as a hyper parameter. If the counter does not exceed the threshold, then the process may proceed back to step 712 to reapply new pairs of models to the labeled data. If the counter exceeds the threshold in decision 736, then the process may proceed to step 726.

In step 726, data associated with the labeled data is discarded. Discarded data is data that may not be selected and/or displayed to a user.

Accordingly, implementations of the systems and methods discussed herein provide for digital data extraction via a multi-stage or iterative machine-learning extraction process utilizing a plurality of models/algorithms. In many implementations, these models are orchestrated in an architecture that balances association matching and exact matching to extract content from labeled data (e.g., data characterized as a line item or non-line item). A second machine learning model may implement a series of validations and comparisons to extract accurate data from digital documents.

For example, a document/page (or portion of a document/page) may be identified to contain non-line items. The document/page (or the portions of the document/page) associated with non-line items may be analyzed using models/algorithms that match strings of data. That is, the predictability of non-line items allows for more stringent search patterns (or sequences or strings). Accordingly, string searches may be based on a database of rules (or predetermined search sequences). If models/algorithms searching the document/page for exact string matches are successful, the confidence value associated with the extracted data may be boosted. That is, there is a higher confidence that the models/algorithms worked well (because there was an exact match to strings in the document/page) and the extracted content is likely accurate.

If models searching the document/page for string matches are unsuccessful, other association matching (or comparison) models/algorithms may be applied to the document/page. That is, instead of applying models/algorithms that search for exact matches of strings in a document/page, models/algorithms may be applied to a document/page that search for associations between strings. If the association matching models successfully correlate strings in the document/page (e.g., a similarity score between two strings satisfy a threshold) then the confidence associated with the extracted data may be boosted. The data extracted from the document and displayed to a user (or selected or stored) will be the data that received the highest confidence scores after performing each of the various matching (or comparison) models.

In contrast, when the document (or portions of the document/page) are characterized as a line item, then the document (or the portions of the document/page) associated with line item may be analyzed using models/algorithms that evaluate the similarity of strings of data. That is, comparison algorithms may be implemented because of the variability of data characterized as line items. The models/algorithms employed to perform the comparisons (e.g., fuzzy matching algorithms/models) may correlate strings based on associations between strings, not exact matching of strings. In some implementations, after comparing the documents (or portions of documents/pages) using fuzzy matching algorithms/models, then, in some implementations, the documents (or portions of documents/pages) may be compared to strings using exact matching searching algorithms. Additionally or alternatively, rule constraints associated with conditionally extracted data may be evaluated. The data extracted from the document and displayed, selected and/or stored will be the data that is most similar to predetermined search sequences, satisfies rule constraints, and/or receives the highest similarity scores after performing each of the various matching models.

Although primarily discussed in terms of individual pages (e.g., a single page document), in many implementations, documents may be multi-page documents. Pages of a multi-page document may be related by virtue of being part of the same document, but may have very different characteristics: for example, a first page may be a title or cover page with particular features such as document identifiers, addresses, codes, or other such features, while subsequent pages may be freeform text, images, or other data. The systems and methods discussed herein may be applied on a page by page basis, on a document by document basis, and/or on portions of pages to extract content from pages as being part of the same multi-page document and/or to extract content from documents as being of the same type, source, or grouping (sometimes referred to as a "domain").

In one aspect, the disclosure is directed to a method for machine learning-based data extraction executed by one or more computing devices, including determining whether a document label indicates a type of document structure, the document label associated with a document comprising one or more strings; receiving a rule associated with the document label comprising a string sequence; determining whether the string sequence matches the one or more strings in the document; increasing a confidence score in response to the string sequence matching the one or more strings in the document; determining a similarity score indicating a similarity between the string sequence and the one or more strings in the document; increasing the confidence score in response to the similarity score satisfying a first threshold; and displaying, on a display, the one or more strings in the document in response to the confidence score satisfying a second threshold. In some implementations, the type of document structure is a line item structure. In some implementations, the similarity score is determined using a fuzzy model. In some implementations, the computing device determines whether the string sequence matches the one or more strings in the document comprises applying a regular expression parser to match the string sequence with the one or more strings in the document.

In some implementations, the method for machine learning based-data extraction further comprises receiving, a rule constraint associated with the rule, and discarding, the one or more strings in response to the one or more strings not satisfying the rule constraint. In some implementations, the method for machine learning based-data extraction further comprises executing, at least one of an optical character recognition model or a natural language processing model to determine the document label. In another aspect, the disclosure is directed to a method for machine learning-based data extraction executed by one or more computing devices, including: determining whether a document label indicates a type of document structure, the document label associated with a document comprising one or more strings; applying a plurality of searching models to the document to generate a corresponding plurality of arrays of one or more strings; identifying a first similarity score indicating a similarity between each of the plurality of arrays; identifying a second similarity score indicating a correctness of each of the one or more strings in each of the plurality of arrays, in response to the first similarity score satisfying a first threshold; and displaying, on a display, the one or more strings in the document in response to the second similarity score satisfying a second threshold.

In some implementations, the type of document structure is a non-line item structure. In some implementations, the first similarity score indicating the similarity between each of the plurality of arrays is determined using a similarity measure index. In some implementations, the second similarity score indicating the correctness of each of the one or more strings in each of the plurality of arrays is determined using a fuzzy model.

In some implementations, the method for machine learning based-data extraction further comprises determining whether another document label indicates the type of document structure, the another document label associated with the document comprising one or more strings; applying the plurality of searching models to the document to generate the corresponding plurality of arrays of one or more strings; identifying that the first similarity score does not satisfy the first threshold; and applying another plurality of searching models to the another document to generate a corresponding another plurality of arrays of one or more strings, wherein the plurality of searching models comprises a first searching model and a second searching model, and wherein the another plurality of searching models comprises the first searching model and a third searching model.

In yet another aspect, this disclosure is directed to a system for machine learning-based data extraction by a computing device. The system includes a computing device comprising processing circuitry and a network interface, wherein the network interface is configured to receive a document label indicating a type of document structure, and wherein the processing circuitry is configured to: determine whether the document label indicates a first type of document structure, the document label associated with a document comprising one or more strings; receive a rule associated with the document label comprising a string sequence; determine whether the string sequence matches the one or more strings in the document; increase a confidence score in response to the string sequence matching the one or more strings in the document; determine a first similarity score indicating a similarity between the string sequence and the one or more strings in the document; increase the confidence score based on the similarity score satisfying a first threshold; and display the one or more strings in the document in response to at least one of the confidence score satisfying the first threshold.

In some implementations, the processing circuitry is further configured to: determine whether the document label indicates a second type of document structure; apply a plurality of searching models to the document to generate a corresponding plurality of arrays; identify a second similarity score indicating a similarity between each of the one or more arrays; and identify a third similarity score indicating a correctness of each of the one or more strings in each of the one or more arrays, in response to the second similarity score satisfying a second threshold. In some implementations, the first type of document structure is a line item structure.

In some implementations, the processing circuitry is configured to determine whether the string sequence matches the one or more strings in the document by applying a regular expression parser to match the string sequence with the one or more strings in the document. In some implementations, the processing circuitry is further configured to: receive a rule constraint associated with the rule, and discard the one or more strings in response to the one or more strings not satisfying the rule constraint.

In some implementations, the first similarity score is determined using a fuzzy model. In some implementations, the second similarity score is determined using a similarity measure index. In some implementations, the processing circuitry is further configured to: determine whether another document label indicates the second type of document structure, the another document label associated with the document comprising one or more strings; apply the plurality of searching models to the document to generate the corresponding plurality of arrays of one or more strings; identify that the second similarity score does not satisfy the second threshold; and apply another plurality of searching models to the another document to generate a corresponding another plurality of arrays of one or more strings, wherein the plurality of searching models comprises a first searching model and a second searching model, and wherein the another plurality of searching models comprises the first searching model and a third searching model.

In some implementations, the processing circuitry is further configured to execute at least one or an optical character recognition model or a natural language processing model to determine the document label.

C. Computing Environment

Having discussed specific embodiments of the present solution, it may be helpful to describe aspects of the operating environment as well as associated system components (e.g., hardware elements) in connection with the methods and systems described herein.

Figure 8A:
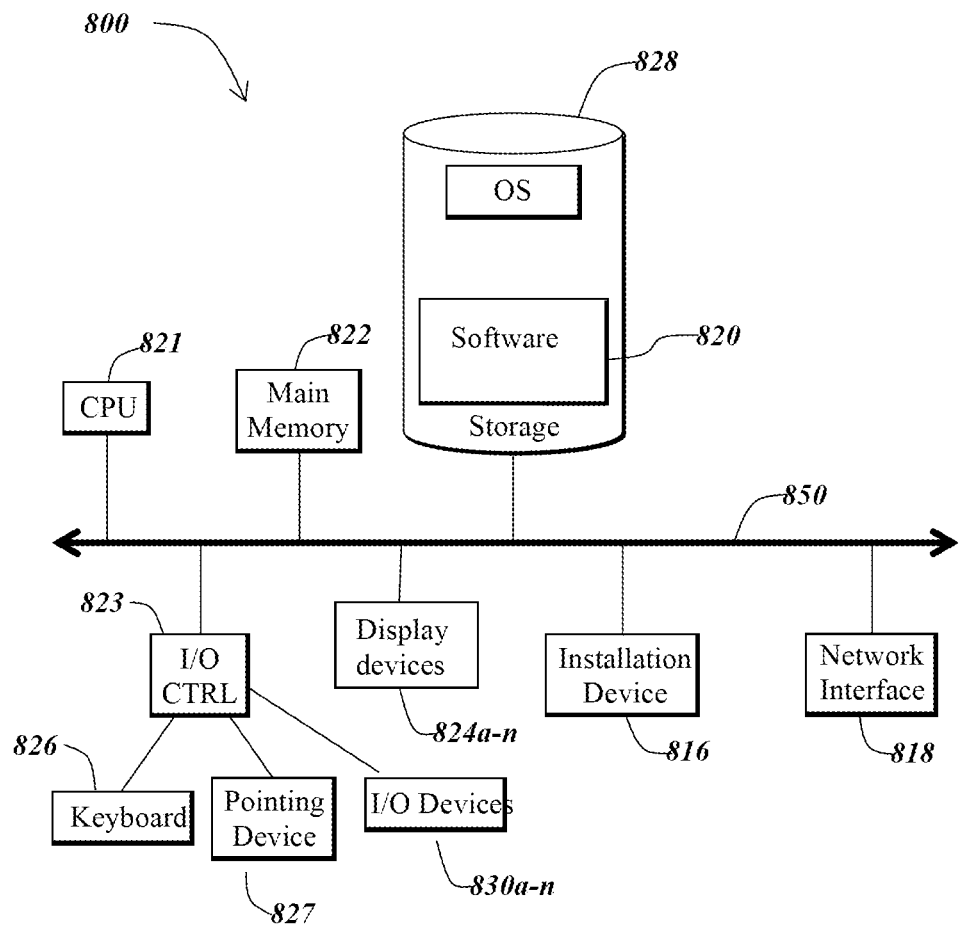
FIGS. 8A and 8B are block diagrams depicting embodiments of computing devices useful in connection with the methods and systems described herein.
Figure 8B:
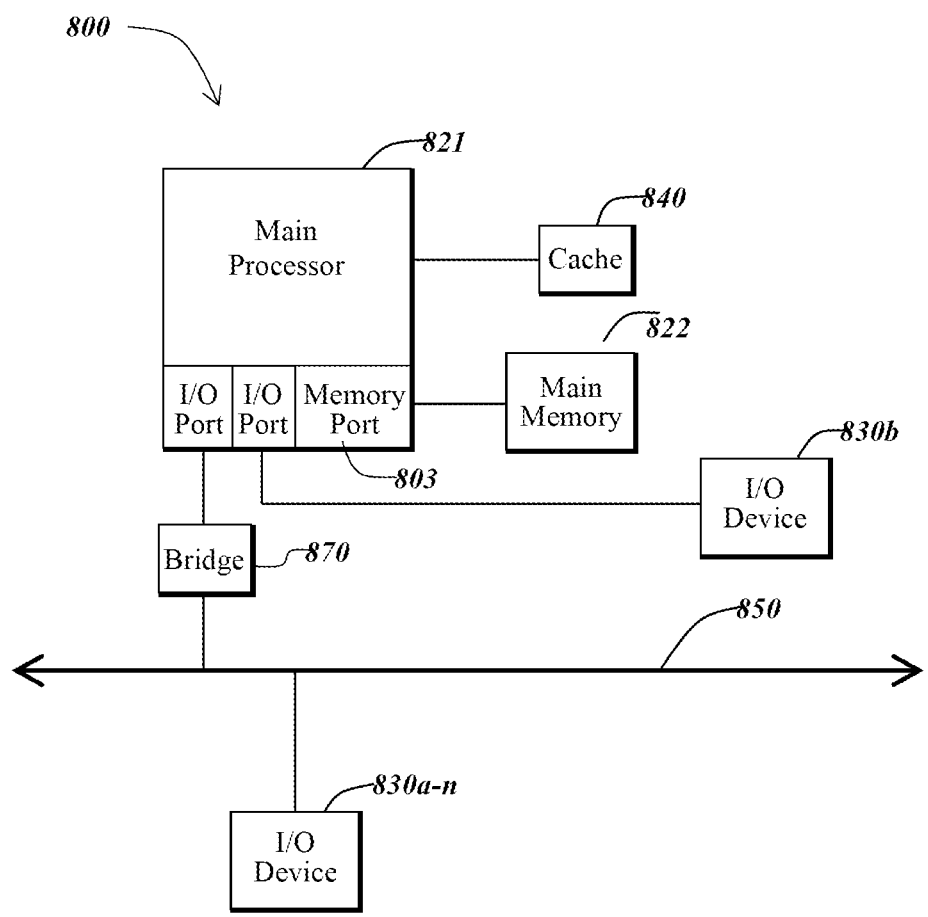

The systems discussed herein may be deployed as and/or executed on any type and form of computing device, such as a computer, network device or appliance capable of communicating on any type and form of network and performing the operations described herein. FIGS. 8A and 8B depict block diagrams of a computing device 800 useful for practicing an embodiment of the wireless communication devices 802 or the access point 806. As shown in FIGS. 8A and 8B, each computing device 800 includes a central processing unit 821, and a main memory unit 822. As shown in FIG. 8A, a computing device 800 may include a storage device 828, an installation device 816, a network interface 818, an I/O controller 823, display devices 824a-824n, a keyboard 826 and a pointing device 827, such as a mouse. The storage device 828 may include, without limitation, an operating system and/or software. As shown in FIG. 8B, each computing device 800 may also include additional optional elements, such as a memory port 803, a bridge 870, one or more input/output devices 830a-830n (generally referred to using reference numeral 830), and a cache memory 840 in communication with the central processing unit 821.

The central processing unit 821 is any logic circuitry that responds to and processes instructions fetched from the main memory unit 822. In many embodiments, the central processing unit 821 is provided by a microprocessor unit, such as: those manufactured by Intel Corporation of Mountain View, California; those manufactured by International Business Machines of White Plains, New York; or those manufactured by Advanced Micro Devices of Sunnyvale, California The computing device 800 may be based on any of these processors, or any other processor capable of operating as described herein. Although referred to as a central processing unit or CPU, in many implementations, the processing unit may comprise a graphics processing unit or GPU (which may be useful not just for graphics processing, but for the types of parallel calculations frequently required for neural networks or other machine learning systems), a tensor processing unit or TPU (which may comprise a machine learning accelerating application-specific integrated circuit (ASIC), or other such processing units. In many implementations, a system may comprise a plurality of processing devices of different types (e.g. one or more CPUs, one or more GPUs, and/or one or more TPUs). Processing devices may also be virtual processors (e.g. vCPUs) provided by a virtual machine managed by a hypervisor of a physical computing device and deployed as a service or cloud or in similar architectures.

Main memory unit 822 may be one or more memory chips capable of storing data and allowing any storage location to be directly accessed by the microprocessor 821, such as any type or variant of Static random access memory (SRAM), Dynamic random access memory (DRAM), Ferroelectric RAM (FRAM), NAND Flash, NOR Flash and Solid State Drives (SSD). The main memory 822 may be based on any of the above described memory chips, or any other available memory chips capable of operating as described herein. In the embodiment shown in FIG. 8A, the processor 821 communicates with main memory 822 via a system bus 850 (described in more detail below). FIG. 8B depicts an embodiment of a computing device 800 in which the processor communicates directly with main memory 822 via a memory port 803. For example, in FIG. 8B the main memory 822 may be DRDRAM.

FIG. 8B depicts an embodiment in which the main processor 821 communicates directly with cache memory 840 via a secondary bus, sometimes referred to as a backside bus. In other embodiments, the main processor 821 communicates with cache memory 840 using the system bus 850. Cache memory 840 typically has a faster response time than main memory 822 and is provided by, for example, SRAM, BSRAM, or EDRAM. In the embodiment shown in FIG. 8B, the processor 821 communicates with various I/O devices 830 via a local system bus 850. Various buses may be used to connect the central processing unit 821 to any of the I/O devices 830, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 824, the processor 821 may use an Advanced Graphics Port (AGP) to communicate with the display 824. FIG. 8B depicts an embodiment of a computer 800 in which the main processor 821 may communicate directly with I/O device 830b, for example via HYPERTRANSPORT, RAPIDIO, or INFINIBAND communications technology. FIG. 8B also depicts an embodiment in which local busses and direct communication are mixed: the processor 821 communicates with I/O device 830a using a local interconnect bus while communicating with I/O device 830b directly.

A wide variety of I/O devices 830a-830n may be present in the computing device 800. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 823 as shown in FIG. 8A. The I/O controller may control one or more I/O devices such as a keyboard 826 and a pointing device 827, e.g., a mouse or optical pen. Furthermore, an I/O device may also provide storage and/or an installation medium 816 for the computing device 800. In still other embodiments, the computing device 800 may provide USB connections (not shown) to receive handheld USB storage devices such as the USB Flash Drive line of devices manufactured by Twintech Industry, Inc. of Los Alamitos, California Referring again to FIG. 8A, the computing device 800 may support any suitable installation device 816, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 800 may further include a storage device, such as one or more hard disk drives or redundant arrays of independent disks, for storing an operating system and other related software, and for storing application software programs such as any program or software 820 for implementing (e.g., configured and/or designed for) the systems and methods described herein. Optionally, any of the installation devices 816 could also be used as the storage device. Additionally, the operating system and the software can be run from a bootable medium.

Furthermore, the computing device 800 may include a network interface 818 to interface to the network 804 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 800 communicates with other computing devices 800' via any type and/or form of gateway or tunneling protocol such as Secure Socket Layer (SSL) or Transport Layer Security (TLS). The network interface 818 may include a built-in network adapter, network interface card, PCMCIA network card, card bus network adapter, wireless network adapter, USB network adapter, modem or any other device suitable for interfacing the computing device 800 to any type of network capable of communication and performing the operations described herein.

In some embodiments, the computing device 800 may include or be connected to one or more display devices 824a-824n. As such, any of the I/O devices 830a-830n and/or the I/O controller 823 may include any type and/or form of suitable hardware, software, or combination of hardware and software to support, enable or provide for the connection and use of the display device(s) 824a-824n by the computing device 800. For example, the computing device 800 may include any type and/or form of video adapter, video card, driver, and/or library to interface, communicate, connect or otherwise use the display device(s) 824a-824n. In one embodiment, a video adapter may include multiple connectors to interface to the display device(s) 824a-824n. In other embodiments, the computing device 800 may include multiple video adapters, with each video adapter connected to the display device(s) 824a-824n. In some embodiments, any portion of the operating system of the computing device 800 may be configured for using multiple displays 824a-824n. One ordinarily skilled in the art will recognize and appreciate the various ways and embodiments that a computing device 800 may be configured to have one or more display devices 824a-824n.

In further embodiments, an I/O device 830 may be a bridge between the system bus 850 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 800 of the sort depicted in FIGS. 8A and 8B may operate under the control of an operating system, which control scheduling of tasks and access to system resources. The computing device 800 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 8 and 8, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system 800 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 800 has sufficient processor power and memory capacity to perform the operations described herein.

In some embodiments, the computing device 800 may have different processors, operating systems, and input devices consistent with the device. For example, in one embodiment, the computing device 800 is a smart phone, mobile device, tablet or personal digital assistant. In still other embodiments, the computing device 800 is an Android-based mobile device, an iPhone smart phone manufactured by Apple Computer of Cupertino, California, or a Blackberry or WebOS-based handheld device or smart phone, such as the devices manufactured by Research In Motion Limited. Moreover, the computing device 800 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some implementations, software functionality or executable logic for execution by one or more processors of the system may be provided in any suitable format. For example, in some implementations, logic instructions may be provided as native executable code, as instructions for a compiler of the system, or in a package or container for deployment on a virtual computing system (e.g. a Docker container, a Kubernetes Engine (GKE) container, or any other type of deployable code). Containers may comprise standalone packages comprising all of the executable code necessary to run an application, including code for the application itself, code for system tools or libraries, preferences, settings, assets or resources, or other features. In many implementations, containers may be platform or operating system agnostic. In some implementations, a docker engine executed by a single host operating system and underlying hardware may execute a plurality of containerized applications, reducing resources necessary to provide the applications relative to virtual machines for each application (each of which may require a guest operating system).

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, Python, Nodejs, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A method for machine learning-based data extraction, comprising:
    receiving, by a computing device, a document comprising one or more strings, the document associated with a document label separate from the one or more strings;
    determining, by the computing device, whether the document label indicates a type of document structure;
    receiving, by the computing device, a rule associated with the document label comprising a string sequence;
    determining, by the computing device, whether the string sequence matches the one or more strings in the document by applying a regular expression parser to match the string sequence with the one or more strings in the document;
    increasing, by the computing device, a confidence score in response to the string sequence matching the one or more strings in the document;
    determining, by the computing device, a similarity score indicating a similarity between the string sequence and the one or more strings in the document;
    increasing, by the computing device, the confidence score in response to the similarity score meeting or exceeding a first score value; and
    displaying, by the computing device, on a display, the one or more strings in the document in response to the confidence score meeting or exceeding a second score value.

2. The method of claim 1, wherein the type of document structure is a line item structure.

3. The method of claim 1, further comprising:
    receiving, by the computing device, a rule constraint associated with the rule;
    discarding, by the computer, the one or more strings in response to the one or more strings not satisfying the rule constraint.

4. The method of claim 1, wherein the similarity score is determined using a fuzzy model.

5. The method of claim 1, further comprising:
    executing, by the computing device, at least one of an optical character recognition model or a natural language processing model to determine the document label.

6. A method for machine learning-based data extraction comprising:
    receiving, by a computing device, a document comprising one or more strings, the document associated with a document label separate from the one or more strings;
    determining, by the computing device, whether the document label indicates a type of document structure;
    applying, by the computing device, a plurality of searching models to the document to generate a corresponding plurality of arrays of one or more strings;
    identifying, by the computing device, a first similarity score indicating a similarity between each of the plurality of arrays;
    identifying, by the computing device, a second similarity score, different from the first similarity score, indicating a correctness of each of the one or more strings in each of the plurality of arrays, in response to the first similarity score meeting or exceeding a first score value, wherein the second similarity score indicating the correctness of each of the one or more strings in each of the plurality of arrays is determined using a fuzzy model; and
    displaying, by the computing device, on a display, the one or more strings in the document in response to the second similarity score meeting or exceeding a second score value.

7. The method of claim 6, wherein the first similarity score indicating the similarity between each of the plurality of arrays is determined using a similarity measure index.

8. The method of claim 6, wherein the type of document structure is a non-line item structure.

9. The method of claim 6, further comprising:
    applying, by the computing device, the plurality of searching models to a second document to generate a second corresponding plurality of arrays of one or more strings;
    identifying, by the computing device, that a third similarity score indicating a similarity between each of the second corresponding plurality of arrays does not meet or exceed the first score value; and
    applying, by the computing device, a second, different plurality of searching models to the second document to generate a corresponding another plurality of arrays of one or more strings.

10. A system for machine learning-based data extraction comprising:
    a computing device comprising processing circuitry and a network interface;
    wherein the network interface is configured to receive a document comprising one or more strings, the document associated with a document label, separate from the one or more strings, indicating a type of document structure; and
    wherein the processing circuitry is configured to:
        determine whether the document label indicates a first type of document structure;
        receive a rule associated with the document label comprising a string sequence;
        determine whether the string sequence matches the one or more strings in the document by applying a regular expression parser to match the string sequence with the one or more strings in the document;
        increase a confidence score in response to the string sequence matching the one or more strings in the document;

determine a first similarity score indicating a similarity between the string sequence and the one or more strings in the document;

increase the confidence score based on the similarity score meeting or exceeding a first score value;

display the one or more strings in the document in response to the confidence score meeting or exceeding a second score value.

11. The system of claim 10, wherein the processing circuitry is further configured to:

determine whether the document label indicates a second type of document structure;

apply a plurality of searching models to the document to generate a corresponding plurality of arrays of one or more strings;

identify a second similarity score indicating a similarity between each of the plurality of arrays; and identify a third similarity score indicating a correctness of each of the one or more strings in each of the one or more arrays, in response to the second similarity score meeting or exceeding a third score value.

12. The system of claim 10, wherein the first type of document structure is a line item structure.

13. The system of claim 10, wherein the processing circuitry is further configured to:

receive a rule constraint associated with the rule; and discard the one or more strings in response to the one or more strings not satisfying the rule constraint.

14. The system of claim 10, wherein the first similarity score is determined using a fuzzy model.

15. The system of claim 11, wherein the second similarity score is determined using a similarity measure index.

16. The system of claim 11, wherein the processing circuitry is further configured to:

determine whether another document label indicates the second type of document structure, the another document label associated with the document comprising one or more strings;

apply the plurality of searching models to the document to generate the corresponding plurality of arrays of one or more strings;

identify that the second similarity score does not meet or exceed the second score value; and apply another plurality of searching models to the another document to generate a corresponding another plurality of arrays of one or more strings;

wherein the plurality of searching models comprises a first searching model and a second searching model; and wherein the another plurality of searching models comprises the first searching model and a third searching model.

17. The system of claim 10, wherein the processing circuitry is further configured to execute at least one or an optical character recognition model or a natural language processing model to determine the document label.

* * * * *